(12) United States Patent
Soryal

(10) Patent No.: US 11,526,374 B2
(45) Date of Patent: *Dec. 13, 2022

(54) DEDICATED DISTRIBUTION OF COMPUTING RESOURCES IN VIRTUALIZED ENVIRONMENTS

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,569

(22) Filed: Apr. 12, 2021

(65) Prior Publication Data
US 2021/0255887 A1 Aug. 19, 2021

Related U.S. Application Data

(63) Continuation of application No. 16/394,215, filed on Apr. 25, 2019, now Pat. No. 10,977,072.

(51) Int. Cl.
*G06F 9/455* (2018.01)
*G06F 9/50* (2006.01)
*G06F 3/06* (2006.01)

(52) U.S. Cl.
CPC ........ *G06F 9/45558* (2013.01); *G06F 3/0604* (2013.01); *G06F 3/067* (2013.01);
(Continued)

(58) Field of Classification Search
CPC .. G06F 9/45558; G06F 3/0604; G06F 3/0631; G06F 3/0664; G06F 3/067;
(Continued)

(56) References Cited

U.S. PATENT DOCUMENTS

| 7,912,955 B1* | 3/2011 | Machiraju | G06F 9/5077 709/221 |
| 8,141,090 B1* | 3/2012 | Graupner | G06F 9/5077 718/1 |

(Continued)

FOREIGN PATENT DOCUMENTS

JP 5827594 12/2015

OTHER PUBLICATIONS

U.S. Notice of Allowance dated Nov. 27, 2020 in U.S. Appl. No. 16/394,215.

*Primary Examiner* — Benjamin C Wu
(74) *Attorney, Agent, or Firm* — Hartman & Citrin LLC

(57) ABSTRACT

Concepts and technologies directed to dedicated optical distribution of computing resources in virtualized environments are disclosed herein. In various aspects, a system can include a processor and memory storing instructions that, upon execution, cause performance of operations. The operations can include receiving a virtual machine creation request that includes a virtual processing requirement and a virtual memory requirement for a virtual machine. The operations can include accessing a physical host infrastructure map that identifies remainder resources from physical host servers within a datacenter. The operations can include creating a simulation test routine and assembling a candidate resource set from the remainder resources. The operations can include establishing a dedicated processing path and a dedicated memory path for the candidate resource set. The operations can include initiating the simulation test routine on the candidate resource set via the dedicated processing path and the dedicated memory path.

20 Claims, 8 Drawing Sheets

(52) U.S. Cl.
CPC .......... *G06F 3/0631* (2013.01); *G06F 3/0664* (2013.01); *G06F 9/5077* (2013.01); *G06F 2009/45583* (2013.01); *G06F 2009/45595* (2013.01)

(58) Field of Classification Search
CPC ......... G06F 9/5077; G06F 2009/45583; G06F 2009/45595
See application file for complete search history.

(56) References Cited

U.S. PATENT DOCUMENTS

| | | | |
|---|---|---|---|
| 8,429,276 B1 | 4/2013 | Kumar et al. | |
| 8,914,797 B2 | 12/2014 | Osogami et al. | |
| 9,003,037 B2 | 4/2015 | Beveridge | |
| 9,336,031 B2 | 5/2016 | Hackett et al. | |
| 9,384,056 B2 | 7/2016 | Lipchuk et al. | |
| 9,466,036 B1 | 10/2016 | Vicaire | |
| 10,021,008 B1* | 7/2018 | Pai | H04L 47/821 |
| 10,025,627 B2 | 7/2018 | Ferris | |
| 10,120,726 B2 | 11/2018 | Anand et al. | |
| 10,148,592 B1* | 12/2018 | Pai | H04L 41/0681 |
| 10,180,859 B1 | 1/2019 | Khafizov et al. | |
| 10,305,733 B1* | 5/2019 | Jones, II | H04L 41/0806 |
| 2006/0085668 A1 | 4/2006 | Garrett | |
| 2009/0300210 A1 | 12/2009 | Ferris | |
| 2010/0319004 A1 | 12/2010 | Hudson | |
| 2011/0055378 A1 | 3/2011 | Ferris | |
| 2013/0007710 A1 | 1/2013 | Vedula | |
| 2013/0097601 A1 | 4/2013 | Podvratnik | |
| 2013/0124712 A1* | 5/2013 | Parker | H04L 43/55 709/224 |
| 2013/0219391 A1 | 8/2013 | Lee | |
| 2014/0007097 A1* | 1/2014 | Chin | G06F 9/455 718/1 |
| 2014/0067496 A1* | 3/2014 | Buswell | H04L 47/821 705/26.3 |
| 2014/0280956 A1* | 9/2014 | Shu | H04L 41/0895 709/226 |
| 2014/0343915 A1 | 11/2014 | Song | |
| 2015/0378786 A1 | 12/2015 | Suparna et al. | |
| 2016/0156567 A1 | 6/2016 | Miyahara et al. | |
| 2016/0191407 A1 | 6/2016 | Dvorkin | |
| 2017/0116036 A1 | 4/2017 | Bieswanger | |
| 2017/0289060 A1 | 10/2017 | Aftab | |
| 2018/0181383 A1 | 6/2018 | Jagannath | |
| 2018/0181456 A1 | 6/2018 | Kim | |
| 2018/0267833 A1 | 9/2018 | Chen | |
| 2019/0324820 A1 | 10/2019 | Krishnan | |
| 2019/0394219 A1 | 12/2019 | Huang | |

\* cited by examiner

DEDICATED DISTRIBUTION OF COMPUTING RESOURCES IN VIRTUALIZED ENVIRONMENTS

CROSS-REFERENCE TO RELATED APPLICATIONS

This application is a continuation of and claims priority to U.S. patent application Ser. No. 16/394,215, entitled "Dedicated Distribution of Computing Resources in Virtualized Environments," filed Apr. 25, 2019, now U.S. Pat. No. 10,977,072, which is incorporated herein by reference in its entirety.

BACKGROUND

In some datacenters, the physical host networking devices may be distributed across various locations. Through virtualized network architecture, the physical host networking devices can provide a virtual datacenter that appears cohesive to a user data plane. Communication service providers can implement network virtualization platforms to share virtualized infrastructure that supports multiple communication services and network applications (including real-time and non-real-time applications). In some instances, a majority of network traffic in datacenters can occur internally, that is, between virtual machines and host devices that are included within the datacenter. Traditional systems for distributed computing environments may cause bottlenecks and single points of failure for processing data. Moreover, the prevalence of shifting processing to a datacenter has increased the volume of incoming data to a petabyte scale, which may cause computing systems to become burdened and operate inefficiently. Additionally, within virtualized environments, physical processing resources and physical memory resources that are tied to handling a particular process may be assigned, but not actually be utilized, thereby reducing performance and wasting resources of the datacenter.

SUMMARY

The present disclosure is directed to dedicated optical distribution of computing resources in virtualized environments. According to one aspect of the concepts and technologies disclosed herein, a system is disclosed. In some embodiments, the system can include a processor and a memory. The memory can store computer-executable instructions that, when executed by the processor, cause one or more instances of the processor to perform operations. In some embodiments, the operations can include receiving a virtual machine creation request that includes a virtual processing requirement and a virtual memory requirement for a virtual machine. The operations can include accessing a physical host infrastructure map that identifies remainder resources from physical host servers within a datacenter. In some embodiments, the remainder resources can include a plurality of unassigned processing units and a plurality of unassigned memory devices. The operations can include creating a simulation test routine based on the virtual processing requirement and the virtual memory requirement. The operations can include assembling a candidate resource set from the remainder resources. In some embodiments, the candidate resource set can include at least one unassigned processing unit from the plurality of unassigned processing units and at least one unassigned memory device from the plurality of unassigned memory devices. The operations can include establishing a dedicated processing path and a dedicated memory path for the candidate resource set. The operations can include initiating the simulation test routine on the candidate resource set via the dedicated processing path and the dedicated memory path.

In some embodiments, the operations can include determining whether the candidate resource set satisfies the virtual processing requirement and the virtual memory requirement for the virtual machine. In some embodiments, the operations can further include instructing a hypervisor to create the virtual machine using the candidate resource set, where the instructing may occur in response to determining that the candidate resource set satisfies the virtual processing requirement and the virtual memory requirement for the virtual machine.

In some embodiments, the operations can further include reconfiguring at least one of the dedicated processing path or the dedicated memory path for the candidate resource set, where the reconfiguring can occur in response to determining that the candidate resource set does not satisfy at least one of the virtual processing requirement or the virtual memory requirement for the virtual machine. The operations can include reinitiating the simulation test routine and determining that reconfiguring at least one of the dedicated processing path or the dedicated memory path enables the candidate resource set to satisfy the virtual processing requirement and the virtual memory requirement for the virtual machine.

In some embodiments, the operations can further include reconfiguring the candidate resource set to include another remainder resource, where the reconfiguring can occur in response to determining that the candidate resource set does not satisfy at least one of the virtual processing requirement or the virtual memory requirement for the virtual machine. The operations can include reinitiating the simulation test routine and determining that reconfiguring the candidate resource set to include another remainder resource enables the candidate resource set to satisfy the virtual processing requirement and the virtual memory requirement for the virtual machine.

According to another aspect of the concepts and technologies disclosed herein, a method is disclosed, according to an embodiment. The method can include receiving, by a system of a datacenter, a virtual machine creation request that includes a virtual processing requirement and a virtual memory requirement for a virtual machine. The method can include accessing, by the system, a physical host infrastructure map that identifies remainder resources from physical host servers within a datacenter. The method can include creating, by the system, a simulation test routine based on the virtual processing requirement and the virtual memory requirement. The method can include assembling, by the system, a candidate resource set from the remainder resources. In some embodiments, the remainder resources can include a plurality of unassigned processing units and a plurality of unassigned memory devices. In some embodiments, the candidate resource set can include at least one unassigned processing unit from the plurality of unassigned processing units and at least one unassigned memory device from the plurality of unassigned memory devices. The method can include establishing, by the system, a dedicated processing path and a dedicated memory path for the candidate resource set. The method can include initiating, by the system, the simulation test routine on the candidate resource set via the dedicated processing path and the dedicated memory path.

In some embodiments, the method can further include determining, by the system, whether the candidate resource set satisfies the virtual processing requirement and the virtual memory requirement for the virtual machine. In some embodiments, the method can include instructing, by the system, a hypervisor to create the virtual machine using the candidate resource set, where the instructing may occur in response to determining that the candidate resource set satisfies the virtual processing requirement and the virtual memory requirement for the virtual machine.

In some embodiments, the method can include reconfiguring, by the system, at least one of the dedicated processing path or the dedicated memory path for the candidate resource set, where the reconfiguring can occur in response to determining that the candidate resource set does not satisfy at least one of the virtual processing requirement or the virtual memory requirement for the virtual machine. The method can include reinitiating, by the system, the simulation test routine. The method can include determining, by the system, that reconfiguring at least one of the dedicated processing path or the dedicated memory path enables the candidate resource set to satisfy the virtual processing requirement and the virtual memory requirement for the virtual machine.

In some embodiments, the method can include reconfiguring, by the system, the candidate resource set to include another remainder resource, where the reconfiguring can occur in response to determining that the candidate resource set does not satisfy at least one of the virtual processing requirement or the virtual memory requirement for the virtual machine. The method can include reinitiating, by the system, the simulation test routine. The method can include determining, by the system, that reconfiguring the candidate resource set to include another remainder resource enables the candidate resource set to satisfy the virtual processing requirement and the virtual memory requirement for the virtual machine.

According to yet another aspect, a computer storage medium is disclosed. The computer storage medium can have computer-executable instructions stored thereon. When the computer-executable instructions are executed by a processor, the processor can perform operations. In some embodiments, the processor can be included in a datacenter. In some embodiments, the operations can include receiving a virtual machine creation request that includes a virtual processing requirement and a virtual memory requirement for a virtual machine. The operations can include accessing a physical host infrastructure map that identifies remainder resources from physical host servers within a datacenter. In some embodiments, the remainder resources can include a plurality of unassigned processing units and a plurality of unassigned memory devices. In some embodiments, the operations can include creating a simulation test routine based on the virtual processing requirement and the virtual memory requirement. The operations can include assembling a candidate resource set from the remainder resources. In some embodiments, the candidate resource set can include at least one unassigned processing unit from the plurality of unassigned processing units and at least one unassigned memory device from the plurality of unassigned memory devices. The operations can include establishing a dedicated processing path and a dedicated memory path for the candidate resource set. The operations can include initiating the simulation test routine on the candidate resource set via the dedicated processing path and the dedicated memory path.

In some embodiments, the operations can further include determining whether the candidate resource set satisfies the virtual processing requirement and the virtual memory requirement for the virtual machine. In some embodiments, the operations can include instructing a hypervisor to create the virtual machine using the candidate resource set, where the instructing can occur in response to determining that the candidate resource set satisfies the virtual processing requirement and the virtual memory requirement for the virtual machine.

In some embodiments, the operations can include reconfiguring at least one of the dedicated processing path or the dedicated memory path for the candidate resource set, where the reconfiguring can occur in response to determining that the candidate resource set does not satisfy at least one of the virtual processing requirement or the virtual memory requirement for the virtual machine. The operations can include reinitiating the simulation test routine. The operations can include determining that reconfiguring at least one of the dedicated processing path or the dedicated memory path enables the candidate resource set to satisfy the virtual processing requirement and the virtual memory requirement for the virtual machine.

In some embodiments, the operations can include reconfiguring the candidate resource set to include another remainder resource, where the reconfiguring can occur in response to determining that the candidate resource set does not satisfy at least one of the virtual processing requirement or the virtual memory requirement for the virtual machine. The operations can include reinitiating the simulation test routine. The operations can include determining that reconfiguring the candidate resource set to include another remainder resource enables the candidate resource set to satisfy the virtual processing requirement and the virtual memory requirement for the virtual machine.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
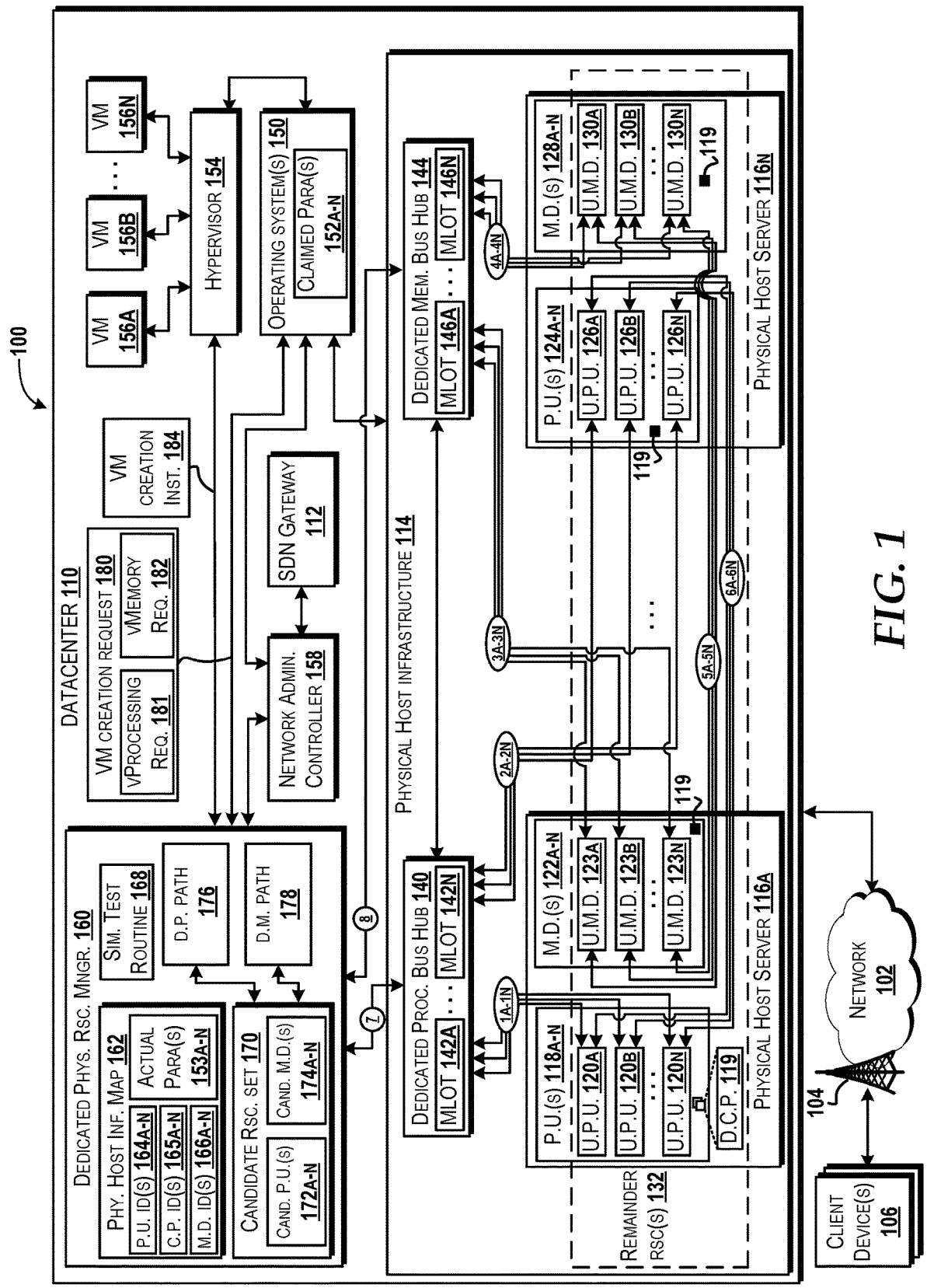
FIG. 1 is a block diagram illustrating an example operating environment in which aspects of dedicated optical distribution of computing resources in virtualized environments can be implemented, according to an illustrative embodiment.

The following detailed description is directed to dedicated optical distribution of computing resources in virtualized environments. In some virtualized datacenter environments, a network administrator may rely on a hypervisor to manage the concurrent execution of one or more virtual machines, where each virtual machine can have virtual processing requirements and/or virtual memory requirements. In some instances, the hypervisor may be configured as a "type-1" native or bare-metal hypervisor that can control and/or run directly on the physical hardware computing resources of a physical host server without reliance on an operating system to execute or otherwise operate between the physical host server and the hypervisor, thereby causing each virtual machine to be contained or otherwise restricted to use in only the physical host server in which the hypervisor directly resides. As a result, utilization of physical computing resources—such as processing resources (e.g., from physical central processing units and/or physical graphics processing units), memory resources (e.g., memory storage, disk bandwidth), portions thereof, or the like—may be wasted by the hypervisor because the hypervisor may be limited to allocating only processing units and/or memory devices on which the hypervisor directly resides, thereby rendering some processing resources and/or memory resources unusable and unassignable to other virtual machines.

For example, a physical server may have 8 processing units (e.g., central processing units) and a memory storage device that provides 100 terabytes of disk storage, where the physical server hosts a bare-metal hypervisor. A network administrator may seek to have the bare-metal hypervisor create two virtual machines on this physical server, where the first virtual machine requires 4 processing units and 20 terabytes of disk storage, and the second virtual machine requires 4 processing units and 30 terabytes of disk storage. In this example, the bare-metal hypervisor may assign 50% of the processing resources of the physical server to each virtual machine (e.g., 4 processing units to each virtual machine), and 50% of the memory resources of the physical server based on the requirements of each virtual machine (e.g., 20% of memory assigned to the first virtual machine and 30% of memory assigned to the second virtual machine). However, in this example, 50% (e.g., 50 terabytes) of memory may be unusable and unassignable to other virtual machines because all of the processing resources have already been assigned, and because conventional hardware architecture may not allow for the memory storage device on one physical server to be directly accessed by another physical server since the bare-metal hypervisor is operating directly on the hardware resources on which the bare-metal hypervisor resides. As such, memory resources and/or processing resources may be wasted and not accessible in conventional virtualized environments.

By way of another example, a physical host infrastructure can include a plurality of physical host servers that collectively provide 8 central processing units. Two virtual machines may already exist and be running using the physical host servers. For instance, a first virtual machine may execute a first application and require the processing power of 3 central processing units from the physical host servers. A second virtual machine may execute another application and require the processing power of 4 central processing units from the physical host servers. This means that 1 central processing unit remains and can be designated as a remainder resource from among the 8 central processing units provided by the physical host servers. Typical configurations of physical host infrastructure may not be able to utilize the one remaining central processing unit that is available and unassigned for use, thereby effectively wasting physical hardware resources. Conventional attempts to utilize the one remainder resource may rely exclusively on a shared communication bus; however, this can impede the operating efficiency and effectiveness of using the one remainder resource because, in typical configurations, a shared queue (and/or shared communication interface) may be used to access the remainder resource, thereby increasing processing and access latency, while also preventing directly, dedicated access to (only) the remainder resource. Therefore, embodiments of the present disclosure can enable direct access and communication with one or more instance of remainder resources, without having to route data through a shared queue and/or a shared communication interface, thereby allowing allocation and aggregation of physical compute resources across various physical locations to support the execution and creation of a virtual machine. As such, embodiments of the present disclosure can improve the functioning of the datacenter and increase processing output.

Another technical challenge may arise in situations where the virtualized datacenter environment utilizes a physical server that executes an operating system and the operating system resides or otherwise operates between the physical computing resources and the hypervisor. Stated differently, a data center may utilize a hypervisor that is configured as a "type-2" hosted hypervisor that executes on the operating system supported by the host devices (e.g., a physical server). The hosted hypervisor may rely on the operating system to provide information about the processing resources and memory resources for underlying physical computing resources because the hosted hypervisor does not reside directly on the physical host device and the hosted hypervisor does not have root access to the processing resources and memory resources. As such, the hosted hypervisor may be dependent on the operating system to provide parameters about the processing resources and memory resources. For example, the operating system may claim that the underlying processing resources provide 8 processing units, where each processing unit provides 2.4 gigahertz (Ghz) per second processing power, and thus a claimed processing parameter may be stored by the operating system, and accessible to the hosted hypervisor, that indicates "2.4 Ghz/sec." Therefore, in a situation where a hosted hypervisor is requested to create a virtual machine that has a virtual processing requirement of 4 Ghz/sec processing power, the hosted hypervisor may look to the operating system, determine that the operating system alleges that two processing units can provide 4.8 Ghz/sec processing power (i.e., two processing units claimed to each provide 2.4 Ghz/sec), and therefore the hosted hypervisor may assume that allocating two processing units is enough (i.e., because the claimed 4.8 Ghz/sec is more than the requirement of 4 Ghz/sec). However, because the hosted hypervisor obtains claimed parameters about processing resources and/or memory resources from the operating system, the hosted hypervisor may not be privy to the actual hardware architecture and/or other processing operations which may cause each processing unit and/or memory device to operate less than the claimed amount. For example, although an instance of a claimed parameter for each processing unit alleges that 2.4 Ghz/sec can be provided, the actual processing power of each processing unit may provide only 1.8 Ghz/sec, and therefore in the example above, allocation of two processing units by the hosted hypervisor would not be enough to satisfy the virtual processing demands of the virtual machine. This can cause delays in virtual machine instantiation and waste resource utilization through inaccurate reporting of computing capabilities.

Therefore, aspects of the present disclosure can provide a virtualized datacenter environment that improves the utilization of computing resources that reside on separate instances of physical host infrastructure by allocating processing and memory resources via dedicated communication paths so as to support and facilitate the creation and ongoing execution of virtual machines. In various embodiments, aspects of the present disclosure can provide a dedicated physical resource manager that executes within a datacenter and can have root access to various computing resource instances (e.g., instances of processing units and/or memory storage devices) provided by one or more instances of physical host infrastructure within a datacenter, such as one or more instances of a physical host server. The dedicated physical resource manager may operate parallel to (or in some embodiments as a part of) one or more instance of a hypervisor to support the hypervisor by determining actual capabilities of remainder resources and establishing dedicated communication paths by which externally located processing units and memory devices can be aggregated together which otherwise would not have been available for use by the hypervisor. By performing one or more operations discussed herein, aspects of the present disclosure can ensure proper allocation and distribution of computing resources across multiple physical host servers within datacenters, thereby improving virtualized processing capabilities through an increased amount of virtual machines hosted within the virtualized environment of the datacenter.

In various embodiments, aspects of the present disclosure can establish the formation of one or more instances of dedicated communication paths (e.g., dedicated processing paths and/or dedicated memory paths) through the utilization of an independent, dedicated connection interface that can provide direct connections and direct communicative coupling between two or more processing units and/or memory devices, thereby allowing individual instances of a physical processing unit and/or a physical memory device to be accessed and utilized on different physical host devices, irrespective of whether other physical resources on the same physical host device have already been allocated. In various embodiments of the present disclosure, each physical host server can have hardware circuitry configured such that each processing unit has a corresponding, dedicated communication port and each memory device has a corresponding, dedicated communication port, thereby allowing individual processing units from different physical host servers to be aggregated through a direct connection so as to form a processing resource mesh that can be dynamically adjusted based on virtual processing requirements, and allowing individual memory devices from different physical host servers to be aggregated through direct connection so as to form a memory resource mesh that can be dynamically adjusted based on virtual memory requirements. For example, in some embodiments, each processing unit (e.g., each central processing unit) can have a direct connection to a dedicated communication port (i.e., a communication port that is dedicated solely to the processing unit), where the dedicated communication port can bypass a shared network interface and/or shared system bus of the physical host server (e.g., bypassing an ethernet port, a SATA interface, and eSATA interface, etc.). In some embodiments, the dedicated communication port of a processing unit and/or a memory device in one physical host server can be configured to directly connect to another processing unit and/or another memory device of another physical host server. Alternatively, and/or additionally, each processing unit and/or memory device can have a dedicated communication port (which may be another, second communication port) that connects to an instance of a dedicated bus hub that is external to the physical host servers and allows for aggregation of physical processing units and/or physical memory devices on different physical host servers. In some embodiments, a dedicated communication port can be configured as an optical communication interface that communicatively couples to a multi-lane optical transceiver, where the multilane optical transceiver may reside in a dedicated bus hub that is external to the physical host server (e.g., a dedicated processing bus hub and/or a dedicated memory bus hub). In various embodiments, the multi-lane optical transceiver can enable optical communicative coupling between two or more instances of a processing unit and/or a memory device, thereby enabling allocation and aggregation of individual processing resources and/or memory resources so as to utilize remaining resources on one or more physical host servers.

In various embodiments, the dedicated physical resource manager can communicatively couple with the physical host infrastructure so that prior to the hypervisor relying solely on claimed parameters of processing resources and/or memory resources to create or alter a virtual machine, the dedicated physical resource manager can search for remaining processing resources and remaining memory resources amongst the physical host servers of the physical host infrastructure, verify whether the remainder resources can be aggregated to satisfy the virtual processing requirements and/or virtual memory requirements of a virtual machine, and enable aggregation of distributed physical processing and memory resources through the establishment of dedicated communication paths. The dedicated physical resource manager can detect that the claimed parameters for processing resources and memory resources are not accurate as reported by the operating system, and thus the dedicated physical resource manager can verify how much of a delay to processing and/or memory access is caused due to distances between various physical host servers. In turn, the dedicated physical resource manager can create a simulated test routine to mimic the virtual processing and memory requirements so as to confirm that aggregating processing units and/or memory devices into a candidate resources set (for generation and/or reconfiguration of a virtual machine) will satisfy the virtual processing requirements and virtual memory requirements. As such, aspects of the present disclosure can improve the performance of a datacenter by increasing physical processing and physical memory utilization so as to optimize support for hosting virtual machines. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein will be described, according to an illustrative embodiment. The operating environment 100 shown in FIG. 1 includes a communications network ("network") 102 that is communicatively coupled to a network access point 104, one or more instances of a client device 106, and a datacenter 110. It should be understood that the network 102 can include almost any type of computer network as well as communications networks. The network 102 can be hosted, in part or in whole, by one or more communications service provider, and the physical devices may be located in the same, proximate, and/or remote physical location from each other. The network 102 can include one or more instances of a radio access network, a core network (e.g., an evolved packet core network, a New Radio core network, etc.), an IP-based network, a transport network, an optical transport network, a circuit switched network, a mobile Wide Area Network, a combination thereof, or the like. In some embodiments, the datacenter 110 can be associated with at least a portion of the network 102, such as the portion which is operated by the communications service provider, although this may not necessarily be the case in all embodiments. The network 102 can host and/or be in communication with the datacenter 110 that can host one or more instances of virtualized and/or non-virtualized network services. For example, in some embodiments, the datacenter 110 can provide communication services, compute services, storage services, routing services, switching services, relay services, and/or other virtualized or non-virtualized network services. It should be understood that the term "service" should be construed as one or more executing applications that can provide a set of communication and/or network functions on behalf of the datacenter 110 and/or the network 102, and therefore the term "service" is not used, and should not be construed or interpreted, to invoke any abstract idea, judicial exception, or any non-patent eligible subject matter. The network services can be used by a service provider, by third parties, and/or by customers via client devices, servers, and/or other virtualized and/or non-virtualized computing systems. Further aspects that can be provided by an embodiment of the network 102 are discussed below with respect to FIG. 6. It should be understood that the examples provided are for illustration purposes only, and therefore should not be construed as limiting in any way.

In some embodiments, the operating environment 100 can include one or more instances of the client device 106. Instances of the client device 106 refers to any user equipment and/or computer system that sends and/or receives communications to the datacenter 110 via the network access point 104 and/or the network 102. Embodiments of the client device 106 can include, but should not be limited to, a user equipment, a mobile communications device (e.g., a smartphone), a server, a desktop computer, a laptop computer, a tablet, a customer premise equipment, a switch, or other computing systems that can send and/or receive communications with the datacenter 110. It is understood that zero, one, or more than one instances of the client device 106 can be present within various embodiments of the operating environment 100. Further discussion of aspects of an embodiment of the client device 106 is discussed below with respect to FIG. 8.

In various embodiments, instances of the network access point 104 can provide communicative coupling between one or more devices (e.g., the client device 106) and the network 102. The network access point 104 can provide wired and/or wireless communicative coupling and can include, but should not be limited to, one or more of a base transceiver station, a wireless router, a femtocell, an eNodeB, a NodeB, a gNodeB (i.e., an access point that incorporates New Radio access technology that supports 5G standards or future standards), a multi-standard metro cell node, a customer premise edge node (e.g., an optical network terminal), and/or other network nodes or combinations thereof that are capable of providing communication to and/or from the network 102. It should be understood that the examples provided are for illustration purposes only, and therefore should not be construed as limiting in any way.

In various embodiments, the datacenter 110 can include one or more computing systems that host, support, or otherwise facilitate operation of the datacenter 110, such as a software defined networking ("SDN") gateway 112, instances of physical host infrastructure 114, an operating system 150, a hypervisor 154, a network administration controller 158, and/or a dedicated physical resource manager 160. In some embodiments, the SDN gateway 112 can provide a network communication interface by which the network 102 communicates with or otherwise relays information to and/or from the network 102. In various embodiments, the SDN gateway 112 can provide messages and requests to one or more elements of the datacenter 110, such as the network administration controller 158. In some embodiments, the network administration controller 158 can be configured to operate or otherwise be supported by a physical server, an application, and/or a virtual machine. In some embodiments, an instance of the client device 106 can provide input to the datacenter 110 via the network access point 104 and the network 102, and the SDN gateway 112 may relay information within the datacenter 110 so as to request and/or invoke processing and analysis using one or more virtual machines.

In various embodiments, the datacenter 110 can include physical host infrastructure, such as the physical host infrastructure 114. The physical host infrastructure 114 can provide physical computing resources that support or otherwise facilitate operation of a virtualized computing environment. As such, the physical host infrastructure 114 can include various network devices and nodes that support transportation of communications for processing and analysis, such as servers, switches, routers, gateways, terminals, and/or other physical computing elements that facilitate the hosting of one or more virtual machines. For clarity purposes only, the physical host infrastructure 114 is illustrated in FIG. 1 as including one or more physical host servers, such as physical host servers 116A-N, a dedicated processing bus hub 140, and a dedicated memory bus hub 144. It is understood that, in some embodiments, other network elements can be included in the physical host infrastructure 114 to facilitate one or more operations discussed herein as understood by one of ordinary skill in the technology. For example, in some embodiments, the datacenter 110 can include one or more aspects discussed below with respect to FIGS. 5, 6, 7, and/or 8. It should be understood that the examples provided are for illustration purposes only, and therefore should not be construed as limiting in any way.

In various embodiments, the physical host infrastructure 114 can include one or more instances of physical computer systems, such as the physical host servers 116A-N. As illustrated in FIG. 1, each of the physical host servers 116A-N can include physical computer systems that provide processing resources and/or memory resources. For example, processing resources can be provided by one or more instances of a processing unit, such as processing units 118A-N and/or processing units 124A-N corresponding to the physical host servers 116A and 116N, respectively. In some embodiments, instances of a processing unit (e.g., the processing units 118A-N and/or the processing units 124A-N) can be one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. In some embodiments, a processing unit may be referred to as a "processor," although this may not necessarily be the case in every embodiment. Further discussion of embodiments of an instance of a processing unit and/or compute resources can be found with respect to FIG. 7 and FIG. 8.

In various embodiments, when a processing resource of the physical host infrastructure 114 is available for allocation and use, and thus is not already assigned, designated, or otherwise reserved, then the processing resource may be considered to be an unassigned processing unit, such as unassigned processing units 120A-N from among the processing units 118A-N of the physical host server 116A and/or unassigned processing units 126A-N from among the processing units 124A-N of the physical host server 116N. As illustrated in FIG. 1, the number of unassigned processing units 120A-N and/or 126A-N may vary at a specific instance in time based on virtual processing requirements from among various virtual machines (e.g., virtual machines 156A-N) and/or any other processing activities of the physical host infrastructure 114. It is understood that, in some embodiments, the dedicated physical resource manager 160 may be aware that one of the processing units 118A-N and/or 124A-N will become available for use at a future time, and thus may perform one or more operations in anticipation of one or more instances of the processing units 118A-N and/or 124A-N becoming available for use and designation. As such, the examples provided herein are for illustration purposes only. In various embodiments, each processing resource corresponds with a processing identifier. For example, each of the processing units 118A-N and 124A-N corresponds with an instance of processing unit identifiers 164A-N. The processing unit identifiers 164A-N can be stored in a physical host infrastructure map 162, which will be discussed in further detail below. The processing unit identifiers 164A-N can allow the dedicated physical resource manager 160 the ability to identify which processing units reside on a particular physical host server of the physical host infrastructure 114.

In various embodiments, the physical host infrastructure 114 can include and/or otherwise provide memory resources to facilitate and support the creation and execution of virtual machines, such as the virtual machines 156A-N. For example, the memory resources of the physical host infrastructure 114 can include one or more instances of a memory storage device, such as memory devices 122A-N and/or memory devices 128A-N corresponding to the physical host servers 116A and 116N, respectively. In some embodiments, instances of the memory devices 122A-N and/or 128A-N may be referred to as "memory," although this may not necessarily be the case in every embodiment. In various embodiments, instances of memory devices (e.g., the memory devices 122A-N and/or 128A-N) can include one or more hardware components that perform storage operations, including temporary or permanent storage operations. In some embodiments, the memory devices 122A-N and/or 128A-N can include volatile and/or non-volatile memory implemented in any method or technology for storage of information such as computer-readable instructions, data structures, program modules, or other data disclosed herein. It is understood that, in the claims, use of the terms "memory," "memory device," "computer storage medium" (or variations thereof) does not include, and shall not be construed or otherwise interpreted to cover or include, a wave or a signal per se and/or communication media. Further discussion of embodiments of an instance of memory resources can be found with respect to FIG. 7 and FIG. 8.

In various embodiments, when a memory resource of the physical host infrastructure 114 is available for allocation and use, and thus is not already assigned or designated, or otherwise reserved, then the memory resource may be considered to be an unassigned memory device, such as unassigned memory devices 123A-N from among the memory devices 122A-N of the physical host server 116A and/or the unassigned memory devices 130A-N from among the memory devices 128A-N of the physical host server 116N. As illustrated in FIG. 1, the number of unassigned memory devices 123A-N and/or 130A-N may vary at a specific instance in time based on virtual memory requirements from among various virtual machines (e.g., the virtual machines 156A-N) and/or any other data storage activities of the physical host infrastructure 114. It is understood that, in some embodiments, the dedicated physical resource manager 160 may be aware that one of the memory devices 122A-N and/or 128A-N will become available for use at a future time, and thus may perform one or more operations in anticipation of one or more instances of the memory devices 122A-N and/or 128A-N becoming available for use and designation. As such, the examples provided herein are for illustration purposes only. In various embodiments, each memory device corresponds with a memory identifier. For example, each of the memory devices 122A-N and 128A-N corresponds with an instance of one of the memory device identifiers 166A-N. The memory device identifiers 166A-N can be stored in the physical host infrastructure map 162, which will be discussed in further detail below. The memory device identifiers 166A-N can allow the dedicated physical resource manager 160 the ability to identify which memory devices reside on a particular physical host server of the physical host infrastructure 114.

In various embodiments, computing resources which remain available and/or otherwise unallocated and assignable for use in the creation and/or execution of a virtual machine (e.g., the virtual machines 156A-N) can be considered a remainder resource, such as remainder resources 132. The remainder resources 132 can include a plurality of unassigned processing units and a plurality of unassigned memory devices, such as any of the unassigned processing units 120A-N, 126A-N and/or the unassigned memory device 123A-N, 130A-N. In various embodiments, one instance of a processing unit and/or a memory device can be designated as a remainder resource, and thus can be included in the remainder resources 132. As such, the remainder resources 132 refer to processing units and/or memory devices (e.g., the unassigned processing units 120A-N, 126A-N and/or the unassigned memory device 123A-N, 130A-N) which are currently available for assignment and allocation to implement for the creation, execution, and/or reconfiguration of a virtual machine, such as any of the virtual machines 156A-N.

In some embodiments, each processing unit (e.g., the processing units 118A-N, 124A-N) and thus also each unassigned processing unit (e.g., the unassigned processing units 120A-N, 126A-N) of a physical host server (e.g., the physical host servers 116A-N) can be accessed, allocated, and/or assigned individually via a communication port that is dedicated or otherwise reserved specifically for the particular processing unit, such as by an instance of a dedicated communication port 119 for each of the processing units 118A-N, 124A-N. In various embodiments, at least one instance of the dedicated communication port 119 can be provided for each processing unit, such as each of the processing units 118A-N and 124A-N, each having at least one, separate instance of the dedicated communication port 119. In some embodiments, an instance of the dedicated communication port 119 can provide an optical interface that facilitates optical communicative coupling. As such, an instance of the dedicated communication port 119 can provide dedicated optical communication from a single instance of a computing resource (e.g., a processing unit or a memory device) to another element within the datacenter 110.

In various embodiments, each memory device (e.g., the memory devices 122A-N, 128A-N) and thus also each unassigned memory device (e.g., the unassigned memory device 123A-N, 130A-N) can be accessed, allocated, and/or assigned individually via an instance of the dedicated communication port 119 that is designated or otherwise reserved specifically for a particular memory device. In various embodiments, an instance of the dedicated communication port 119 is distinct from a system bus and/or a communication bus because the dedicated communication port 119 is not shared between multiple processing units and/or memory devices, and therefore each dedicated communication port 119 may operate in a per-resource manner (i.e., each dedicated communication port 119 is designated and usable for communications to and/or from a particular processing unit and/or memory device). As such, an instance of the dedicated communication port 119 can be designated or otherwise allocated for use by a particular processing unit or a particular memory device. In some embodiments, when an instance of the dedicated communication port 119 is designated for use by a processing unit, the dedicated communication port 119 may be referred to as a dedicated processing port. Similarly, when an instance of the dedicated communication port 119 is designated for use by a memory device, the dedicated communication port 119 may be referred to as a dedicated memory port. If the dedicated communication port 119 is configured for optical communication, then instances of the dedicated communication port 119 for a processing unit or a memory device may be referred to as a dedicated optical processing port and a dedicated optical memory port, respectively. In some embodiments, each instance of a computing resource (e.g., each of the processing units 118A-N, 124A-N and/or the memory devices 122A-N, 128A-N) can have or otherwise be connected to two or more instances of the dedicated communication port 119. In some embodiments, the dedicated communication port 119 can be configured as a dedicated fiber optic port. The dedicated communication port 119 can be configured to bypass a shared communication interface and/or shared system bus that is internal to one of the physical host servers 116A-N (e.g., bypassing an ethernet port, a SATA interface, and an eSATA interface, etc.). It is understood that the examples provided are for illustration purposes only, and therefore should not be construed as limiting in any way.

In various embodiments, each of the physical computing resources of the physical host infrastructure 114 can be accessed individually via a distinct communication path, such as any of the dedicated communication paths 1A-1N, 2A-2N, 3A-3N, 4A-4N, 5A-5N, and/or 6A-6N. In some embodiments, an instance of a distinct communication path can support optical communicative coupling, such as via a fiber optic strand of a fiber optic cable. Each distinct communication path (e.g., any of the dedicated communication paths 1A-1N, 2A-2N, 3A-3N, 4A-4N, 5A-5N, and/or 6A-6N) can couple to an instance of the dedicated communication port 119. In some embodiments, instances of a dedicated communication path can refer to a distinct communication path that can connect one processing unit to another processing unit, one memory device to another memory device, and/or to the dedicated processing bus hub 140 and the dedicated memory bus hub 144. For example, as illustrated in FIG. 1, the dedicated communication paths 5A-5N can be configured to connect the unassigned memory devices 123A-N to the unassigned memory devices 130A-N, respectively. Similarly, in some embodiments, the dedicated communication paths 6A-6N can be configured to connect (and in some embodiments provide optical communicative coupling) the unassigned processing units 120A-N directly to the unassigned processing units 126A-N, respectively. In some embodiments, each computing resource (e.g., a processing unit and/or a memory device) can have a distinct communication path that is configured to connect to a dedicated bus hub, such as one of the dedicated processing bus hub 140 and/or the dedicated memory bus hub 144, that is external to the particular physical host server in which the computing resource resides. For example, the distinct, dedicated communication paths 1A-1N, 2A-2N can be configured to connect (and in some embodiments provide optical communicative coupling) the unassigned processing units 120A-N, 124A-N to the dedicated processing bus hub 140, respectively. Similarly, the dedicated communication paths 3A-3N, 4A-4N can be configured to connect (and in some embodiments provide optical communicative coupling) the unassigned memory devices 123A-N, 130A-N to the dedicated memory bus hub 144, respectively. In some embodiments, a dedicated communication path can be referred to as a distinct communication path.

In various embodiments, the dedicated processing bus hub 140 and the dedicated memory bus hub 144 can each be configured to provide an optical bus that interconnects two or more distinct communication paths so that instances of unassigned processing resources and unassigned memory resources can be grouped together to support the creation and execution of a virtual machine. In some embodiments, the dedicated processing bus hub 140 and the dedicated memory bus hub 144 can each be configured to include one or more instances of a multi-lane optical transceiver ("MLOT"), such as the MLOT 142A-N and the MLOT 146A-N, respectively. In various embodiments, an instance of an MLOT (e.g., the MLOTs 142A-N, 146A-N) can include interconnected transmitter and receiver modules and interfaces that facilitate unidirectional and/or bi-directional communication, where one or more distinct communication paths may directly connect to a particular instance of the MLOT based on whether the distinct communication path is used by an unassigned processing unit or an unassigned memory device. In various embodiments, each of the dedicated processing bus hub 140 and the dedicated memory bus hub 144 can allow information from two or more distinct communication paths to be joined, assembled, or otherwise combined together to support the creation, execution, and/or (re)configuration of a virtual machine (e.g., any of the virtual machines 156A-N). In various embodiments, each of the dedicated processing bus hub 140 and the dedicated memory bus hub 144 can be communicatively coupled to the dedicated physical resource manager 160 so that processing and memory resources can be analyzed and allocated to support creation of a virtual machine. An example embodiment of a multi-lane optical transceiver is discussed below in further detail with respect to FIG. 2. In some embodiments, each of the dedicated processing bus hub 140 and the dedicated memory bus hub 144 can include one or more instances of beam splitters, laser drivers, optical ports, and/or other optical networking elements that facilitate optical communication and coupling to, from, and/or between the physical host servers 116A-N and the dedicated physical resource manager 160.

In various embodiments, the physical host infrastructure 114 can support execution of one or more instances of an operating system, such as the operating system 150. In an embodiment, the operating system 150 illustrated in FIG. 1 may correspond with an operating system from the LINUX family of operating systems built around a LINUX kernel, however this may not be the case for every embodiment. In some embodiments, the operating system 150 can include, but is not limited to, one or more instances from members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like. It should be understood that the examples provided are for illustration purposes only, and therefore should not be construed as limiting in any way.

In various embodiments, the operating system 150 can have access to one or more claimed parameters associated with a physical computing resource of the physical host infrastructure 114, such as claimed parameters 152A-N. As used herein, the phrase "claimed parameter" refers to a metric and/or specification which a particular instance of a computing resource (e.g., a processing unit and/or a memory device) is claimed (i.e., reported or otherwise alleged) to have and/or provide as originally configured. For example, each instance of a processing resource (e.g., the processing units 118A-N, 124A-N, and thus also the unassigned processing units 120A-N, 126A-N) can be configured to provide a particular processing power (i.e., clock speed) which can be expressed in one of the claimed parameters 152A-N as a rate in cycles per second, such as megahertz per second (MHz/sec) or gigahertz per second (GHz/sec). Therefore, in an embodiment, each of the processing units 118A-N, 124A-N, and thus also the unassigned processing units 120A-N, 126A-N, can correspond with one of the claimed parameters 152A-N which indicates the particular processing power for the particular processing resource. By way of example, the physical host server 116A may be configured to execute the processing units 118A-N, where each of the processing units 118A-N is claimed by the manufacturer to operate at 2.4 GHz/sec. It is understood that various processing units of a particular physical host server can have different processing powers from each other, and thus correspond with claimed parameters that indicate different values. In some embodiments, an instance of a claimed parameter (e.g., one of the claimed parameters 152A-N) may be referred to as a claimed processing parameter when the claimed parameter corresponds with, or otherwise indicates, a processing power for an instance of a processing unit (e.g., indicated in GHz/sec).

In various embodiments, each instance of a memory resource (e.g., the memory devices 122A-N, 128A-N, and thus also the unassigned memory devices 123A-N, 130A-N) can be configured to provide a particular storage capacity which can be expressed in one of the claimed parameters 152A-N in terms of available data storage (e.g., megabytes, gigabytes, terabytes, petabytes, etc.). Therefore, each of the memory devices 122A-N, 128A-N, and thus also the unassigned memory devices 123A-N, 130A-N, can correspond with one of the claimed parameters 152A-N which can indicate a particular available storage capacity of the particular memory resource. By way of example, the unassigned memory devices 123A-N, 130A-N can be configured as memory partitions that each provide specific data storage capacities, such as each of the unassigned memory devices 123A-N, 130A-N providing 100 gigabytes of storage. It is understood that various memory devices of a particular physical host server can have different storage capacities from each other, and thus correspond with claimed parameters that indicate different values. In some embodiments, an instance of a claimed parameter (e.g., one of the claimed parameters 152A-N) may be referred to as a claimed memory parameter when the claimed parameter corresponds with, or otherwise indicates, a data storage capacity for an instance of a memory device (e.g., indicated in gigabytes). It is understood that the examples provided are for illustration purposes only, and therefore should not be construed as limiting in any way.

In various embodiments, an instance of the operating system 150 can support a hypervisor, such as the hypervisor 154. As illustrated in FIG. 1, the hypervisor 154 can be configured as a hosted hypervisor which is supported by the operating system 150 to obtain information about the processing resources and memory resources, such as via the claimed parameters 152A-N. As such, in some embodiments, the operating system 150 can be disposed between the physical host servers 116A-N that support or otherwise host virtual machines and one or more instance of the hypervisor 154. In some embodiments, the hypervisor 154 may facilitate operations within the datacenter 110 to facilitate virtualized functions, such as the instantiation, execution, support, and/or (re)configuration of one or more of the virtual machines 156A-N. In some embodiments, when the hypervisor 154 is configured as a hosted hypervisor, the hypervisor 154 may not have root access to a kernel of one or more of the physical host servers 116A-N of the physical host infrastructure 114, and therefore may rely on the operating system 150 and/or the dedicated physical resource manager 160 to provide access to information about physical computing resources to support the virtual machines 156A-N. In some embodiments, the hypervisor 154 may receive instructions from the dedicated physical resource manager 160 to facilitate creation and/or configuration of one or more of the virtual machines 156A-N. It should be understood that the examples provided are for illustration purposes only, and therefore should not be construed as limiting in any way.

In various embodiments, the datacenter 110 can support one or more instances of a virtual machine, such as the virtual machines 156A-N, where the total number of virtual machines supported by the datacenter 110 can vary dependent on the particular configuration and/or computing requirements of the datacenter 110. Therefore, although three instances of a virtual machine are illustrated in FIG. 1, it is understood that various embodiments can have a different number of virtual machines present within the datacenter 110. In various embodiments, the virtual machines 156A-N can be hosted by computing resources provided by the physical host infrastructure 114. Each of the virtual machines 156A-N can extend the functionality of the underlying physical computing resources (e.g., the physical host servers 116A-N) because instances of unassigned processing units (e.g., the unassigned processing units 120A-N, 126A-N) and unassigned memory devices (e.g., the unassigned memory devices 123A-N, 130A-N) can be selected, assigned, and allocated to operate collectively to support one or more of the virtual machines 156A-N despite two or more instances of physical computing resources being located in different physical host servers within the datacenter 110. Therefore, in various embodiments, the physical computing resources (e.g., any of the processing units 118A-N, 124A-N and/or the memory devices 122A-N, 128A-N) can be allocated and assigned to provide the virtual computing resources for the virtual machines 156A-N. In various embodiments, virtual computing resources can include a virtual processor and/or a virtual memory that can be scaled based on the needs of a particular virtual machine. The virtual machines 156A-N can support one or more network services that are virtualized and provide one or more communication, storage, and/or processing capabilities for the datacenter 110. For example, an instance of one of the virtual machines 156A-N can be configured as, or otherwise perform operations associated with, one or more of virtual switches, virtual routers, virtualized routing functions, a virtual tap, a virtual network interface controller, a virtual storage device, a virtual server, or other virtual network functions. In some embodiments, each of the virtual machines 156A-N may be siloed from each other such that each virtual machine operates independent of the other, however this may not necessarily be the case in every embodiment. In some embodiments, a virtual machine can be created or torn-down (i.e., uninstantiated) based on the requirements and/or demand of the datacenter 110. It should be understood that the examples provided are for illustration purposes only, and therefore should not be construed as limiting in any way.

As illustrated in FIG. 1, the datacenter 110 can include an instance of the network administration controller 158. In some embodiments, the network administration controller 158 can be configured as a standalone computing system and/or a program module that communicatively couples to the SDN gateway 112. In some embodiments, the network administration controller 158 may provide a user interface so that one or more client devices, such as an instance of the client device 106, can be presented with and/or provided information and/or input associated with the creation and/or removal of the virtual machines 156A-N and/or any other operations pertaining to the datacenter 110. In some embodiments, a user associated with the client device 106 may provide input via an interface presented by the network administration controller 158. In some embodiments, the network administration controller 158 may be configured to operate as part of a service offered by the datacenter 110. In some embodiments, the network administration controller 158 can facilitate management in the assignment of physical computing resources within the datacenter 110. For example, in some embodiments, the network administration controller 158 may receive input from within the datacenter 110 and/or via the network 102 regarding a request to create a virtual machine, such as illustrated in FIG. 1 as a virtual machine creation request 180. In some embodiments, the virtual machine creation request 180 may be provided on an ad hoc basis based on the particular demands of the datacenter 110 to use virtualized services. In some embodiments, the virtual machine creation request 180 may initiate a request to create or otherwise instantiate a virtual machine that has not yet been created. For example, in an embodiment, the virtual machine 156A may have not yet been created, and thus the virtual machine creation request 180 may request the creation of a virtual machine (e.g., the virtual machine 156A) to fulfill a virtual processing requirement, such as a virtual processing requirement 181, and a virtual memory requirement, such as a virtual memory requirement 182, for a virtual machine (e.g., the virtual machine 156A). The virtual processing requirement 181 can indicate an amount of processing power (e.g., a clock speed in MHz, GHz, etc.) that the virtual machine requires to support virtualized operations of the datacenter 110. The virtual memory requirement 182 can indicate an amount of data storage capacity that the virtual machine requires to support virtualized operations of the datacenter 110. For example, in an embodiment, an instance of the virtual machine creation request 180 can include the virtual processing requirement 181 and the virtual memory requirement 182, where the virtual processing requirement 181 indicates that a virtual machine should provide at least 4 GHz processing power, and the virtual memory requirement 182 indicates that a virtual machine should provide at least 50 gigabytes of data storage capacity. It is understood that the examples provided are for illustration purposes only, and therefore should not be construed as limiting in any way.

In some embodiments, the virtual machine creation request 180 may be provided by the operating system 150 and/or the network administration controller 158 to the hypervisor 154. In some embodiments, the dedicated physical resource manager 160 can monitor the hypervisor 154 and intercept the virtual machine creation request 180 prior to the creation of the virtual machine that is the object of the virtual machine creation request 180 (e.g., the virtual machine 156A). In some embodiments, the virtual machine creation request 180 may be provided from the operating system 150 and/or the network administration controller 158 to the dedicated physical resource manager 160, which can perform one or more operations on behalf of and/or in cooperation with the hypervisor 154 to provide allocation, assignment, and distribution of computing resources of the physical host infrastructure 114. In some embodiments, the dedicated physical resource manager 160 can intercept the virtual machine creation request 180 from reaching the hypervisor 154 and/or instruct the network administration controller 158, the operating system 150, and/or the hypervisor 154 to provide the virtual machine creation request 180 to the dedicated physical resource manager 160 prior to the creation of a virtual machine (e.g., any of the virtual machines 156A-N). It is understood that the examples provided are for illustration purposes only, and therefore should not be construed as limiting in any way.

In various embodiments, the datacenter 110 can include one or more instances of the dedicated physical resource manager 160. In some embodiments, the dedicated physical resource manager 160 can be configured to operate on a physical computer system of the datacenter 110, such as an instance of a computing system discussed below with respect to FIG. 8. In some embodiments, the dedicated physical resource manager 160 can include or otherwise have access to a physical host infrastructure map 162 that is associated with the physical host infrastructure 114. In various embodiments, the physical host infrastructure map 162 can provide a dynamic mapping of the computing resources which are included in the physical host infrastructure 114, and which of the virtual machines 156A-N are assigned to use one or more instances of processing resources and/or memory resources of the physical host infrastructure 114. In various embodiments, the physical host infrastructure map 162 can include an index of some and/or all of the physical processing units, physical memory devices, and communication paths that can be used to support various virtual machines of the datacenter 110. For example, the physical host infrastructure map 162 can include the processing unit identifiers 164A-N, communication path identifiers 165A-N, and the memory device identifiers 166A-N. Each of the processing unit identifiers 164A-N can correspond with, identify, or otherwise indicate a particular physical processing unit instance, such as one of the processing units 118A-N, 124A-N (which includes the unassigned processing units 120A-N, 126A-N). Each of the memory device identifiers 166A-N can correspond with, identify, or otherwise indicate a particular memory device instance, such as one of the memory devices 122A-N, 128A-N (which includes the unassigned memory devices 123A-N, 130A-N). Each of the communication path identifiers 165A-N can correspond with, identify, or otherwise indicate a particular dedicated communication path instance, such as one of the dedicated communication paths 1A-1N, 2A-2N, 3A-3N, 4A-4N, 5A-5N, and 6A-6N. In various embodiments, the physical host infrastructure map 162 can associate, point, or otherwise provide a reference to an instance of a claimed parameter (e.g., from among the claimed parameters 152A-N) for each of the processing unit identifiers 164A-N, communication path identifiers 165A-N, and memory device identifiers 166A-N.

For example, in an embodiment, the unassigned processing units 120A, 120B, and 120N may be configured from a hardware manufacturer to provide an alleged processing power of 1.8 GHz/sec, 2.4 GHz/sec, and 2.4 GHz/sec, respectively, and thus a corresponding instance of a claimed processing parameter from among the claimed parameters 152A-N can be linked to, or otherwise referenced, for the processing unit identifiers (from among the processing unit identifiers 164A-N) which correspond to the processing units 120A, 120B, and 120N. By way of another example, in an embodiment, the unassigned memory devices 123A-N may be configured from a hardware manufacturer to provide an alleged storage capacity of 64 gigabytes, 128 gigabytes, and 1 terabyte, respectively, and thus a corresponding instance of a claimed memory parameter from among the claimed parameters 152A-N can be linked to, or otherwise referenced for the memory device identifiers (from among the memory device identifiers 166A-N) which correspond to the unassigned memory devices 123A-N. In an embodiment, the dedicated physical resource manager 160 can indicate or otherwise link to an instance of a claimed parameter (from among the claimed parameters 152A-N) for a particular dedicated communication path corresponding to one of the communication path identifiers 165A-N. For example, an instance of a claimed parameter for one of the dedicated communication paths (e.g., one of the dedicated communication paths 1A-1N, 2A-2N, 3A-3N, 4A-4N, 5A-5N, and 6A-6N) can provide an alleged throughput capability (e.g., measured in Gb/sec transfer rate). It is understood that the examples provided are for illustration purposes only, and therefore should not be construed as limiting in any way.

In some embodiments, the physical host infrastructure map 162 can include one or more instances of actual parameters for the computing resources of the physical host infrastructure 114, such as actual parameters 153A-N. Each of the actual parameters 153A-N can provide accurate, usable metrics and/or values for one of a processing unit, a memory device, or a communication path, which may be different from a corresponding one of the claimed parameters 152A-N. Stated simply, a claimed parameter (e.g., from one of the claimed parameters 152A-N) provides an alleged or otherwise theoretical resource value for a computing resource (e.g., a processing resource and/or a memory resource), while an actual parameter (e.g., from one of the actual parameters 153A-N) can provide a real-world, actual, or otherwise usable (and therefore more accurate) resource value which the dedicated physical resource manager 160 can use to adjust, configure, and/or reconfigure which physical computing sources should be assigned, allocated, and dedicated to support a particular virtual machine. For example, in an embodiment, the unassigned processing unit 120A may have a claimed processing parameter of 1.8 GHz/sec processing power, however due to latency in data transfer and routing, the unassigned processing unit 120A may have an actual, usable processing power of 1.4 GHz/sec processing power, which is reflected by a corresponding instance of one of the actual parameters 153A-N. Similarly, the unassigned memory device 130B may have a claimed memory parameter of 100 gigabytes of storage capacity, however due to storage of OEM data (e.g., firmware, system registry, portions of the operating system 150, any other data required to enable data storage functionality) or any other currently stored data, the actual available and usable data storage space may be 85 gigabytes, which is reflected by an instance of one of the actual parameters 153A-N corresponding to the unassigned memory device 130A. Therefore, in various embodiments, for each instance of a processing unit, dedicated communication path, and memory device of the physical host infrastructure, the physical host infrastructure map 162 can indicate or otherwise provide the corresponding resource identifier (i.e., a corresponding processing unit identifier, communication path identifier, memory device identifier), the status of the computing resource (i.e., whether corresponding processing unit, dedicated communication path, or memory device is currently assigned and unavailable, or unassigned and available), the claimed parameter for the computing resource (e.g., the claimed clock speed, storage capacity, throughput, etc.), and the actual parameter for the computing resource (e.g., the usable clock speed, available and accessible storage capacity, and actual throughput).

In various examples, the dedicated physical resource manager 160 can keep inventory of physical computing resources, their corresponding locations, and whether a particular physical computing resource (e.g., a processing unit or a memory device) is assigned (and thus allocated and dedicated for use by an existing virtual machine) or unassigned (and thus available for use by an existing and/or yet to be created virtual machine). The dedicated physical resource manager 160 can analyze and determine which physical computing resources of the physical host infrastructure 114 should be utilized and allocated to support the creation of a virtual machine, such as the virtual machine 156A. As such, the dedicated physical resource manager 160 can use the physical host infrastructure map 162 to identify the remainder resources 132 of the physical host infrastructure 114, such as any of the unassigned processing units 120A-N, 126A-N and the unassigned memory devices 123A-N, 130A-N. In various embodiments, one or more instances of the processing units 118A-N, 124A-N and/or the memory devices 122A-N, 128A-N can be considered a remainder resource (e.g., one of the remainder resources 132) when the particular computing resource is unassigned, unallocated, and/or otherwise available to access and implement for the creation, execution, and/or (re)configuration of a virtual machine (e.g., any of the virtual machines 156A-N). For example, in some embodiments, the dedicated physical resource manager 160 receives the virtual machine creation request 180 requesting the creation of a virtual machine (e.g., the virtual machine 156A), and therefore includes the virtual processing requirement 181 and the virtual memory requirement 182. The dedicated physical resource manager 160 can create, or in some embodiment access, a simulation test routine, such as an instance of a simulation test routine 168, that is based on the virtual processing requirement 181 and the virtual memory requirement 182. For example, the simulation test routine 168 can be configured to mimic the processing and data storage load that would be experienced by the processing resources and memory resources of the physical host infrastructure 114 once the virtual machine 156A is up and running. In some embodiments, the simulation test routine 168 can be configured such that the simulation test routine 168 can be sent to the physical host infrastructure 114 with instructions to send portions of data (i.e., data segments) to specifically identified remainder resources (i.e., processing resources and/or memory resources that are available and unassigned) via the use of particular dedicated communication paths.

In some embodiments, the simulation test routine 168 can be configured to mimic the processing load, network traffic, and/or data storage that would be experienced during the operation of a virtual machine (which is requested to be created or reconfigured if already created). The simulation test routine 168 can be executed and performed on instances of remainder resources which are selected as candidates to potentially support, host, or otherwise facilitate operation of a virtual machine. For example, the dedicated physical resource manager 160 can assemble a candidate resource set, such as a candidate resource set 170, from the remainder resources 132 which are available to support a virtual machine. The candidate resource set 170 can include one or more instances of unassigned processing units and/or unassigned memory devices as physical resource candidates to support a virtual machine, such as illustrated in FIG. 1 by the candidate resource set 170 including candidate processing units 172A-N and candidate memory devices 174A-N. The candidate processing units 172A-N can include one or more instances of the unassigned processing units 120A-N, 126A-N from the remainder resources 132, and one or more instances of the unassigned memory devices 123A-N, 130A-N from the remainder resources 132. Therefore, in various embodiments, an instance of the candidate resource set 170 can be uniquely assembled for each virtual machine creation request 180 based on the particular requirements indicated by the virtual machine creation request 180. It is understood that each of the candidate processing units 172A-N and each of the candidate memory devices 174A-N can correspond with a particular processing unit identifier (e.g., one of the processing unit identifiers 164A-N) or memory device identifier (e.g., one of the memory device identifiers 166A-N), respectively. By this, the candidate resource set 170 can indicate which of the remainder resources (i.e., which of the unassigned processing unites 120A-N, 126A-N, and/or unassigned memory devices 123A-N, 130A-N) are candidates to support and host a virtual machine.

The dedicated physical resource manager 160 can use the candidate resource set 170 to determine whether the virtual processing requirement 181 and the virtual memory requirement 182 would be satisfied by the candidate processing units 172A-N and the candidate memory devices 174A-N which are selected for inclusion in the candidate resource set 170. To verify and confirm that the requirements of the virtual machine creation request 180 can be satisfied by the candidate resource set 170, the dedicated physical resource manager 160 can execute the simulation test routine 168, which can provide data to the candidate resources in the candidate resource set 170 (i.e., the candidate processing units 172A-N and the candidate memory devices 174A-N) to execute or otherwise perform functions which, for the candidate processing units 172A-N, would mimic a virtual processing load as defined by the virtual processing requirement 181, and for the candidate memory devices 174A-N would impose the data storage load as defined by the virtual memory requirement 182. In some embodiments, the simulation test routine 168 can be configured so that, once performed or otherwise executed, the particular remainder resource instance (e.g., the unassigned processing units and/or unassigned memory devices which are being used as candidate processing units and candidate memory devices) are instructed or otherwise caused to respond with actual resource values, such as to the actual processing power of the particular processing unit and/or the actual data storage capacity of the particular memory device, which can be used to create (or if already existing, then update) a corresponding one of the actual parameters 153A-N. The dedicated physical resource manager 160 can have an independent, dedicated communication path to each dedicated bus hub, such as communication path 7 that is dedicated to providing a route for data processing to and/or from the dedicated physical resource manager 160 and the dedicated processing bus hub 140, and/or dedicated communication path 8 that is dedicated to providing a route for data storage to and/or from the dedicated physical resource manager 160 and the dedicated memory bus hub 144.

In various embodiments, the dedicated physical resource manager 160 can establish which of the dedicated communication paths pertaining to physical processing units within the physical host infrastructure 114 (i.e., from among the dedicated communication paths 1A-1N, 2A-2N, 6A-6N, and 7 dedicated to physical processing units) should be used so that the candidate processing units 172A-N can be aggregated to collectively provide enough processing power to satisfy the virtual processing requirement 181, and which of the dedicated communication paths pertaining to physical memory devices within the physical host infrastructure 114 (i.e., from among the dedicated communication paths 3A-3N, 4A-4N, and 5A-5N dedicated to physical memory devices) should be used so that the candidate memory devices 174A-N can be aggregated to collectively provide enough data storage capacity to satisfy the virtual memory requirement 182. Specifically, the dedicated physical resource manager 160 can establish a dedicated processing path 176 that indicates and identifies one or more communication paths within the physical host infrastructure 114 that should be used so that the processing by the candidate processing units 172A-N can be aggregated to collectively satisfy the virtual processing requirement 181. Therefore, the dedicated processing path 176 may not necessarily be limited to a single communication path, but rather can refer to two or more communication paths that are dedicated solely to the processing units supporting a virtual machine. Therefore, in various embodiments, the dedicated processing path 176 for the candidate resource set 170 can be an aggregation of multiple communication paths (e.g., from among the communication paths 1A-1N, 2A-2N, 6A-6N, and 7) that can collectively enable routing of raw data to be processed and/or routing of processed data to, from, and/or within the candidate processing units 172A-N selected from among the remainder resources 132 to support the corresponding virtual machine. Similarly, the dedicated physical resource manager 160 can establish a dedicated memory path 178 that indicates and identifies one or more communication paths within the physical host infrastructure 114 that should be used so that the data storage by the candidate memory devices 174A-N can be aggregated to collectively satisfy the virtual memory requirement 182. The dedicated memory path 178 may not necessarily be limited to a single communication path, but can refer to two or more communication paths that are dedicated solely to the memory devices supporting a virtual machine. Therefore, in various embodiments, the dedicated memory path 178 for the candidate resource set 170 can be an aggregation of multiple communication paths (e.g., from among the dedicated communication paths 3A-3N, 4A-4N, 5A-5N, and 8) that can collectively enable routing of raw data to be stored and/or accessed within the candidate memory devices 174A-N selected from among the remainder resources 132 to support the corresponding virtual machine.

By way of example, an embodiment will be discussed to clarify the present disclosure. In an embodiment, the virtual machine creation request 180 may request the creation of a virtual machine (e.g., the virtual machine 156A) using physical computing resources that satisfy the virtual processing requirement 181 of 4 GHz/sec and the virtual memory requirement 182 of 60 gigabytes of data storage capacity. The dedicated physical resource manager 160 can access the physical host infrastructure map 162 and determine that the physical computing resources which make up the remainder resources 132 are available (i.e., any of the unassigned processing units 120A-N, 126A-N and the unassigned memory devices 123A-N, 130A-N). The dedicated physical resource manager 160 can use the processing unit identifiers 164A-N and the memory device identifiers 166A-N to identify the resources values (e.g., processing power, data storage capacity, etc.) indicated by the corresponding claimed parameters 152A-N for the remainder resources 132. In this example, the dedicated physical resource manager 160 can select or otherwise include the unassigned processing units 120A, 120N, and 126N as candidates (i.e., candidate processing units 172A-N) in the candidate resource set 170, and thus the particular processing unit identifier, from among the processing unit identifiers 164A-N, for each of the unassigned processing units 120A, 120N, and 126N can be reflected as the candidate processing units 172A-N within the candidate resource set 170. In this example, the unassigned processing units 120A, 120N, and 126N can each have claimed processing parameters of 2.1 GHz/sec processing power. The dedicated physical resource manager 160 may designate the unassigned processing units 120A and 120N as candidate processing units, which can be indicated by the corresponding processing unit identifiers 164A-N being referenced by the candidate processing units 172A-N for the virtual machine creation request 180. Initially, the unassigned processing units 120N and 126N may be selected because the corresponding claimed processing parameters (e.g., from among the claimed parameters 152A-N) indicate a processing power of 2.4 GHz/sec, which in turn collectively should provide 4.8 GHz/sec, thereby theoretically satisfying the virtual processing requirement 181 of 4 GHz/sec in this example.

Continuing with the above example, the dedicated physical resource manager 160 can continue assembly of the candidate resource set 170 based on the virtual machine creation request 180 by designating candidate memory devices, such as the candidate memory devices 174A-N, to satisfy the virtual memory requirement 182 of 60 gigabytes of data, in this example. Specifically, the dedicated physical resource manager 160 can include the unassigned memory devices 123A and 130A as candidate memory devices (i.e., the candidate memory devices 174A-N corresponding to the virtual machine creation request 180) in the candidate resource set 170 because the unassigned memory devices 123A and 130A are claimed to be able to each store 40 gigabytes of data. The dedicated physical resource manager 160 can configure the candidate resource set 170 such that the particular memory device identifier for each of the unassigned memory devices 123A and 130A, such as one or more of the corresponding memory device identifiers 166A-N, can be reflected as the candidate memory devices 174A-N within the candidate resource set 170. In this example, the unassigned memory devices 123A and 130A can each have a claimed memory parameter (e.g., indicated by one of the claimed parameters 152A-N) that indicates a data storage capacity of 40 gigabytes, which collectively should provide 80 gigabytes of data storage capacity, and thus theoretically should satisfy the virtual memory requirement 182 of 60 gigabytes, in this example.

Continuing with the above example, the dedicated physical resource manager 160 can establish an instance of the dedicated processing path 176 and an instance of the dedicated memory path 178 for the candidate resource set 170 based on the candidate processing units 172A-N and the candidate memory devices 174A-N, respectively. The dedicated processing path 176 and/or the dedicated memory path 178 can serve to activate one or more communication paths between the candidate processing units 172A-N and the candidate memory devices 174A-N, respectively, to facilitate satisfaction of the virtual processing requirement 181 and the virtual memory requirement 182. For the dedicated processing path 176, the dedicated physical resource manager 160 can activate and aggregate one or more communication paths to directly inter-connect the unassigned processing units 120N and 126N, which for the example above can include any of: the communication path 7 communicatively couples the dedicated processing bus hub 140 with the dedicated physical resource manager 160; the communication path 1N from the dedicated processing bus hub 140 to the unassigned processing unit 120N; the communication path 6N from the unassigned processing unit 120N to the unassigned processing unit 126N; and the communication path 2N from the dedicated processing bus hub 140 to the unassigned processing unit 126N. Therefore, in an embodiment, the dedicated processing path 176 can be initially configured so that processed and/or unprocessed data can be sent to, from, and/or between the candidate processing unit 172A-N, which in this example can correspond with the unassigned processing units 120N and 126N. In a similar manner, the dedicated memory path 178 can be configured to aggregate and activate one or more communication paths to directly inter-connect the unassigned memory devices 123A and 130A, which for the example above can include any of: the communication path 8 to access the dedicated memory bus hub 144 from the dedicated physical resource manager 160; the communication path 3A that connects the unassigned memory device 123A to the dedicated memory bus hub 144; the communication path 5A that connects the unassigned memory device 123A to the unassigned memory device 130A; and the communication path 4A that connects the unassigned memory device 130A to the dedicated memory bus hub 144. Therefore, in an embodiment, the dedicated memory path 178 can be initially configured so that processed and/or unprocessed data can be stored in and/or between the candidate memory devices 174A-N, which in this example can correspond with the unassigned memory devices 123A and 130A.

Continuing with the above example, to determine whether the candidate resource set 170 will actually, and not just theoretically, satisfy the virtual processing requirement 181 and the virtual memory requirement 182, the dedicated physical resource manager 160 can generate the simulation test routine 168 based on the virtual processing requirement 181 and the virtual memory requirement 182. Specifically, the simulation test routine 168 can include one or more data packages that can provide and mimic a processing load in order to test whether the candidate processing units 172A-N can satisfy the virtual processing requirement 181. The simulation test routine 168 can also be configured with a file size that mimics the virtual memory requirement 182, thereby enabling verification of whether the candidate memory devices 174A-N can provide enough data storage capacity to satisfy the virtual memory requirement 182. The dedicated physical resource manager 160 can initiate the simulation test routine 168 by distributing the simulation test routine 168 to the candidate resource set 170 (i.e., the unassigned processing units and unassigned memory devices which are assigned to the candidate resource set 170) via the dedicated processing path 176 and the dedicated memory path 178. Therefore, as the simulation test routine 168 is executing, one or more of the communication paths for the dedicated processing path 176 and/or the dedicated memory path 178 can pass processed and unprocessed data to, from, and between the candidate processing units 172A-N and the candidate memory devices 174A-N to verify whether the virtual processing requirement 181 and the virtual memory requirement 182 will be satisfied. The simulation test routine 168 can be configured to provide the dedicated physical resource manager 160 with results (e.g., one or more instances of resource values that correspond with one of the actual parameters 153A-N) of the actual processing power and the actual data storage capacity.

In various embodiments, the dedicated physical resource manager 160 can determine whether the candidate resource set 170 (whether that be an initial or subsequent iteration) can satisfy the virtual processing requirement 181 and the virtual memory requirement 182 for creating and sustaining a virtual machine (e.g., the virtual machine 156A). Based on the simulation test routine 168, the dedicated physical resource manager 160 can compare the actual parameters 153A-N to the claimed parameters 152A-N corresponding to the candidate processing units 172A-N and the candidate memory devices 174A-N (which in the example above initially correspond with the unassigned processing units 120N, 126N and the unassigned memory devices 123A, 130A, respectively). By way of example, the dedicated physical resource manager 160 may determine, based on the simulation test routine 168, that the unassigned processing units 120N, 126N each provide an actual, usable processing power of 1.8 GHz/sec (which may be reflected in a corresponding one of the actual parameters 153A-N), and thus the unassigned processing units 120N, 126N yield a collective processing power of 3.6 GHz/sec, which is less than the virtual processing requirement 181 of 4 GHz/sec, in this example. The cause for the differential between one or more of the actual parameters 153A-N and a corresponding one or more of the claimed parameters 152A-N can be due to the remainder resources 132 each running necessary subroutine for the operating system 150, processing and/or storing firmware, drivers, or any other required operation, process, and/or data that may be fundamental to keeping any of the remainder resources 132 active. In some embodiments, the physical length of the communication paths (e.g., any of the dedicated communication paths 1A-1N, 2A-2N, 3A-3N, 4A-4N, 5A-5N, 6A-6N, etc.) may cause latency that effectively decreases the processing power of the unassigned processing units within the remainder resources 132. In some embodiments, the read/write speed of one or more unassigned memory device of the remainder resources 132 can introduce latency that can effectively diminish or overall impede the physical resource capabilities of the physical host infrastructure 114, thereby potentially causing the candidate resource set 170 (as currently configured) to be unable to satisfy the virtual processing requirement 181 and/or the virtual memory requirement 182. In various embodiments, when either the virtual processing requirement 181 and/or the virtual memory requirement 182 is not satisfied by the candidate resource set 170 (as currently configured), the dedicated physical resource manager 160 may determine the total discrepancy between the target requirement and the actual parameter, such as how much of a differential in GHz/sec exists between the actual processing parameter and the virtual processing requirement 181 and/or the differential between the virtual memory requirement 182 and the actual data storage parameter.

In various embodiments, if the virtual processing requirement 181 and/or the virtual memory requirement 182 is not satisfied by the candidate resource set 170 (as currently configured), the dedicated physical resource manager 160 may determine whether any of the remainder resources 132 are still available for use to supplement and cure the deficiency in processing power and/or storage capacity of the candidate resource set 170, as currently configured. In some embodiments, if one or more instances of the remainder resources 132 are available (i.e., if one or more instances of an unassigned processing unit and/or an unassigned memory device remain available for inclusion in the candidate resource set 170 and are not yet designated to support another virtual machine or other task), then the dedicated physical resource manager 160 may reconfigure the candidate resource set 170 to include another physical resource from the remainder resources 132. For example, in the example discussed above, the actual processing power of the unassigned processing units 120N, 126N (which were initially designated as the candidate processing units 172A-N) may each have been 1.8 GHz/sec, yielding a collective processing capability of 3.6 GHz/sec, which is lower than the virtual processing requirement of 4 GHz/sec, in the example. The dedicated physical resource manager 160 can determine that the unassigned processing unit 120A remains available, and thus reconfigures the candidate resource set 170 by including the unassigned processing unit 120 as one of the candidate processing units 172A-N. In some embodiments, the dedicated physical resource manager 160 can reinitiate the simulation test routine 168 using the reconfigured candidate resource set (i.e., the candidate resource set 170 which has been reconfigured such that the candidate processing units 172A-N now include the unassigned processing units 120A, 120N, and 126N). In response to the simulation test routine 168, in some embodiments, the dedicated physical resource manager 160 may determine that the inclusion of the supplemental unassigned processing unit (e.g., the unassigned processing unit 120A) provides another 1.8 GHz/sec processing power, thereby enabling the candidate processing units 172A-N to collectively provide 5.4 GHz/sec processing power, which satisfies the virtual processing requirement 181. By this, reconfiguring the candidate resource set 170 to include another remainder resource (e.g., the unassigned processing unit 120A) can enable the candidate resource set 170 to satisfy the virtual processing requirement 181 and the virtual memory requirement 182 so as to create and sustain the virtual machine 156A. In some embodiments, the virtual memory requirement 182 may not have been satisfied by a particular configuration of the candidate memory devices 174A-N. As such, the dedicated physical resource manager 160 can identify one of the remainder resources 132 that can cure the data storage differential between the virtual memory requirement 182 and the actual data storage capacity, such as by the addition of one or more unassigned memory devices 123B-123N, and/or 130B-130N.

In some embodiments, the dedicated processing path 176 and/or the dedicated memory path 178 (corresponding to the candidate resource set 170) may be reconfigured so that dedicated communication paths can be included and/or removed. For example, if the candidate resource set 170 is reconfigured such that the candidate processing units 172A-N now include the unassigned processing unit 120A, then the dedicated processing path 176 can be reconfigured so that the dedicated communication path 1A is activated and implemented to connect the processing resources of the candidate resource set 170. By this, data and information can be provided to, from, and/or between the unassigned processing units 120A, 120N, and 126N, the dedicated processing bus hub 140, and the dedicated physical resource manager 160. Because the dedicated processing path 176 can include the aggregation of two or more dedicated communication paths, subsequent reconfigurations to the candidate resource set 170 may also cause the reconfiguration of the dedicated processing path 176. In a similar manner, if the candidate resource set 170 is reconfigured so as to alter the designation of an unassigned memory device as one of the candidate memory devices 174A-N, then the dedicated memory path 178 may also be reconfigured. For example, if the unassigned memory device 130N becomes designated as one of the candidate memory devices 174A-N, then the corresponding dedicated communication path 4N can be activated and included in the dedicated memory path 178. To clarify, each of the dedicated processing path 176 and the dedicated memory path 178 can reserve, designate, activate, and/or isolate.

In some embodiments, the dedicated processing path 176 and/or the dedicated memory path 178 may be reconfigured irrespective of whether the candidate resource set 170 is reconfigured (i.e., irrespective of whether designation of resources are added or removed from the candidate processing units 172A-N and/or the candidate memory devices 174A-N). For example, in an embodiment, the candidate processing units 172A-N may correspond with the unassigned processing units 120A and 126A. In an embodiment, the dedicated processing path 176 may have initially been configured to aggregate and include the communication path 7, the dedicated communication path 1A and the dedicated communication path 2A. In such as configuration, the dedicated processing bus hub 140 may serve as the only relay by which the unassigned processing units 120A and 126A can optically communicate with each other, which in some embodiments may contribute to an increase in latency, which may affect the effective processing power provided. Thus, in an embodiment, the dedicated processing path 176 can be reconfigured to activate the dedicated communication path 6A that provides a direct (optical) connection between the unassigned processing units 120A and 126A. In some embodiments, this can cause a decrease in latency, thereby effectively increasing the processing power of the candidate processing units 172A-N. In some embodiments, activating another dedicated communication path so as to be considered a part of either the dedicated processing path 176 or the dedicated memory path 178 can cause one of the actual parameters 153A-N to be altered because the physical resource is now able to operate closer to one of the corresponding claimed parameters 152A-N. For example, after executing the simulation test routine 168, the collective processing power of the unassigned processing units 120A and 126A (in this example designated as the candidate processing units 172A-N) may be reflected in the actual parameters 153A-N as 1.8 GHz/sec each, collectively yielding 3.6 GHz/sec. In an embodiment, the dedicated processing path 176 may have been reconfigured to activate the dedicated communication path 6A, thereby providing a direct (optical) connection between the unassigned processing units 120A and 126A. Once the simulation test routine 168 is reinitiated and reperformed, the reconfiguration of the dedicated processing path 176 (e.g., by the addition of the dedicated communication path 6A) may have enabled unprocessed data to be transferred between the unassigned processing units 120A and 126A more efficiently, thereby rendering the corresponding actual parameters 153A-N for the unassigned processing units 120A and 126A to yield a processing power of 2.1 GHz/sec, collectively yielding 4.2 GHz/sec, which is larger than the virtual processing requirement 181 of 4 GHz/sec, in this example. As such, the virtual processing requirement 181 can be satisfied in response to reconfiguration of the dedicated processing path 176, without necessarily having to reconfigure the candidate resource set 170. A similar scenario may be provided by reconfiguring the dedicated memory path 178 while preserving the composition of the candidate memory devices 174A-N. For example, the dedicated communication path 5A may be added to the dedicated memory path 178 so as to enable direct (optical) connection between the unassigned memory devices 130A and 123A. By including the dedicated communication path 5A as component route (i.e., a part or segment) of the dedicated memory path 178, the latency between the unassigned memory devices 123A, 130A may decrease, which may enable one or more of the candidate processing units 172A-N to access data faster, thereby enabling one or more of the virtual processing requirement 181 and/or the virtual memory requirement 182 to be satisfied. Therefore, in some embodiments, the virtual processing requirement 181 and/or the virtual memory requirement 182 may be satisfied in response to reconfiguring the dedicated processing path 176 and/or the dedicated memory path 178 without altering the remainder resources 132 of the candidate resource set 170 (i.e., without adding to or removing from the candidate processing units 172A-N and the candidate memory devices 174A-N). By this, reconfiguring the dedicated processing path 176 and/or the dedicated memory path 178 can enable the candidate resource set 170 to satisfy the virtual processing requirement 181 and the virtual memory requirement 182.

In various embodiments, once the dedicated physical resource manager 160 determines that the virtual processing requirement 181 and the virtual memory requirement 182 can be satisfied by implementing the candidate resource set 170, the dedicated processing path 176, and the dedicated memory path 178, the processing units and memory devices which correspond to the candidate processing units 172A-N and the candidate memory devices 174A-N may be assigned to the creation of a virtual machine (e.g., the virtual machine 156A), and thus no longer be designated as one of the remainder resources 132 since the processing unit or memory device is no longer unassigned. This is because the processing units and memory devices may no longer be considered "unassigned" due to their designation as being implemented to support the virtual machine (e.g., the virtual machine 156A). As such, the physical host infrastructure map 162 can be updated so that the processing units and memory devices corresponding to the candidate resource set 170 are designated as assigned, and thus no longer available as one of the remainder resources 132 (i.e., no longer an unassigned processing unit or unassigned memory device).

In various embodiments, the virtual processing requirement 181 and the virtual memory requirement 182 are determined to be satisfied, and the dedicated physical resource manager 160 can create an instance of the virtual machine creation instruction 184. The virtual machine creation instruction 184 can designate which of the physical computing resources and communication paths are to be used to support the creation and/or configuration of a virtual machine (e.g., the virtual machine 156A). For example, in an embodiment, the candidate processing units 172A-N and the candidate memory devices 174A-N of the candidate resource set 170 which satisfy the virtual processing requirement 181 and the virtual memory requirement 182 can correspond with the unassigned processing units 120A, 126A and the unassigned memory devices 123A, 130A, respectively. Each of the unassigned processing units 120A, 126A can correspond with one of the processing unit identifiers 164A-N and each of the unassigned memory devices 123A, 130A can correspond with one of the memory device identifiers 166A-N. As such, the virtual machine creation instruction 184 can include one or more of the processing unit identifiers 164A-N and one or more of the memory device identifiers 166A-N associated with the candidate resource set 170 such that the hypervisor 154 and/or the operating system 150 is instructed to utilize the identified processing units and memory devices to support the virtual machine. Additionally, in some embodiments, the virtual machine creation instruction 184 can include identifiers of the dedicated communication paths which make up the dedicated processing path 176 and the dedicated memory path 178 (e.g., from among the communication path identifiers 165A-N).

In various embodiments, the dedicated physical resource manager 160 can instruct the hypervisor 154 to create the virtual machine 156A using the candidate resources set 170, the dedicated processing path 176, and the dedicated memory path 178 as indicated in the virtual machine creation instruction 184. In some embodiments, the virtual machine creation instruction 184 may command the hypervisor 154 to ignore or otherwise suppress reference to the claimed parameters 152A-N provided by the operating system 150, and instead rely on identifiers and the actual parameters 153A-N provided by the dedicated physical resource manager 160 (e.g., via the virtual machine creation instruction 184). It is understood that the concepts and technologies discussed herein improve the functioning of the datacenter 110 by addressing technical challenges that arise because of, and specifically within, the realm to network technology pertaining to datacenters. It is understood that the examples provided are for illustration purposes only, and therefore should not be construed as limiting in any way.

FIG. 1 illustrates one or more instance of the network 102, the network access point 104, the client device 106, the datacenter 110, the SDN gateway 112, the physical host infrastructure 114, the physical host servers 116A-N, the dedicated communication port 119, the processing units 118A-N, the unassigned processing units 120A-N, the memory devices 122A-N, the unassigned memory devices 123A-N, the processing units 124A-N, the unassigned processing units 126A-N, the memory devices 128A-N, the unassigned memory devices 130A-N, the remainder resources 132, the dedicated processing bus hub 140, the MLOT 142A-N, the dedicated memory bus hub 144, the MLOT 146A-N, the operating system 150, the claimed parameters 152A-N, the hypervisor 154, the virtual machines 156A-N, the network administration controller 158, the dedicated physical resource manager 160, the physical host infrastructure map 162, the processing unit identifiers 164A-N, the communication path identifiers 165A-N, the memory device identifiers 166A-N, the actual parameters 153A-N, the simulation test routine 168, the candidate resource set 170, the candidate processing units 172A-N, the candidate memory devices 174A-N, the dedicated processing path 176, the dedicated memory path 178, the virtual machine creation request 180, the virtual processing requirement 181, the virtual memory requirement 182, and the virtual machine creation instruction 184. It should be understood, however, that some implementations of the operating environment 100 can include zero, one, or more than one instances of these elements of the operating environment 100 shown in FIG. 1. As such, the illustrated embodiment of the operating environment 100 should be understood as being illustrative, and should not be construed as being limiting in any way.

Figure 2:
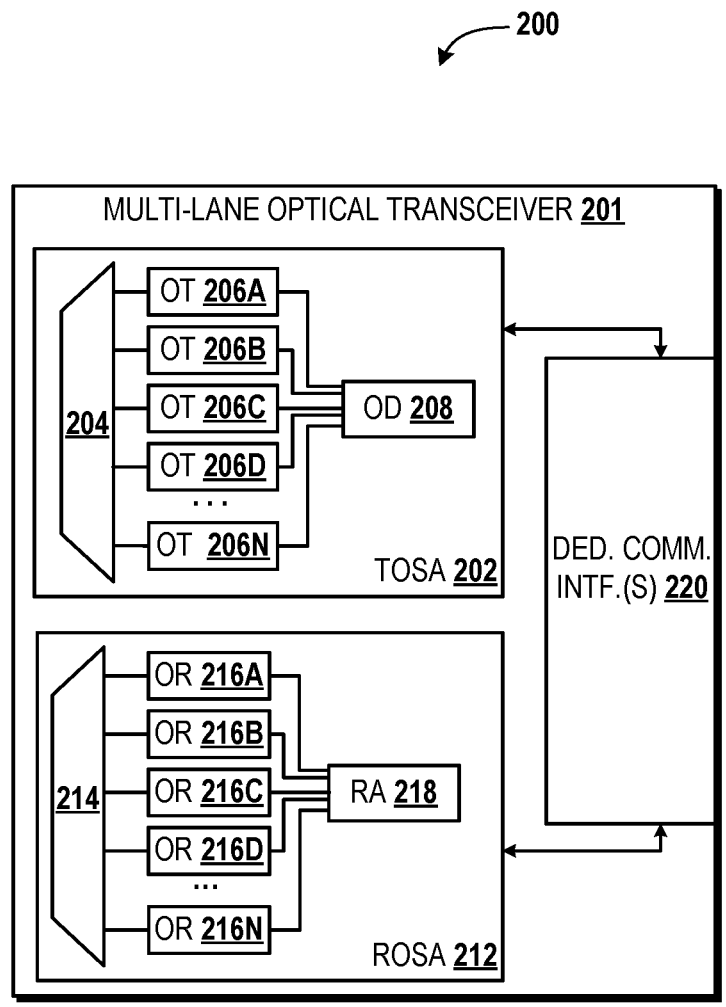
FIG. 2 is a block diagram illustrating aspects of a multi-lane optical transceiver, according to an illustrative embodiment.

Turning now to FIG. 2, with continued reference to FIG. 1, a block diagram 200 that facilitates dedicated optical distribution of computing resources in virtualized environments is provided, according to an illustrative embodiment. The block diagram 200 includes a multi-lane optical transceiver ("MLOT") 201. In various embodiments, each of the MLOTs 142A-N, 146A-N can be configured at least similar to an embodiment of the MLOT 201 illustrated in FIG. 1. In some embodiments, an MLOT (e.g., the MLOT 201 and/or the MLOTs 142A-N, 146A-N) can be configured as a full duplex, photonic-integrated optical transceiver that provides a high-speed link (e.g., via one or more of the dedicated communication paths 1A-1N, 2A-2N, 3A-3N, 4A-4N) with an aggregated data rate (e.g., less than 40 Gb/s, 40 Gb/s, 100 Gb/s, 400 Gb/s, 1 Tb/s, any data rate in between the data rates listed, or more than 1 Tb/s) that can operate with full and/or partial transmit functionality and full and/or partial receive functionality in one or more hosts devices (e.g., the physical host servers 116A-N and/or the dedicated physical resource manager 160). In various embodiments, an MLOT can be configured to comply with one or more industry standards, such as but not limited to, an Institute of Electrical and Electronics Engineers ("IEEE") standard (e.g., an IEEE 802.3 standard), an International Telecommunication Union Telecommunication standardization Sector ("ITU-T") standard (e.g., G.959.1), and/or other industry standards known to one of ordinary skill in the technology.

In various embodiments, an MLOT (e.g., the MLOT 201 and/or the MLOTs 142A-N, 146A-N) can include a transmission optical sub-assembly ("TOSA") 202, and a receiver optical sub-assembly ("ROSA") 212. In some embodiments, an MLOT can include a processor and a memory that can route or otherwise direct one or more communications to, from, and/or within the physical host infrastructure 114 and/or the datacenter 110. In some embodiments, the dedicated physical resource manager 160 may provide functionality to make decisions as to how data should be handled by each of the TOSA 202 and/or the ROSA 212. In some embodiments, the TOSA 202 can include a multiplexer 204, a plurality of optical transmitters 206A-N, and an optical distributor 208. The optical distributor 208 can be communicatively coupled to the optical transmitters 206A-N. Each of the optical transmitters 206A-N can be communicatively coupled with the multiplexer 204. In some embodiments, the optical distributor 208 can include a continuous time linear equalizer that can collect and synchronize data that is conveyed electrically from one or more instances of a dedicated communication interface 220. In some embodiments, the optical distributor 208 can segment a data package into a plurality of data package segments so as to distribute related data across multiple processing resources (e.g., any of the unassigned processing units 120A-N, 126A-N) and/or memory resources (e.g., any of the unassigned memory devices 123A-N, 130A-N) which collectively support a virtual machine associated with the data packet. In some embodiments, the optical distributor 134, 166 can act upon the instruction of the dedicated physical resource manager 160. In some embodiments, the physical host infrastructure map 162 can indicate which of the optical transmitters 206A-N are active and/or should be active and used to optically transmit data to a processing resource and/or a memory resource of the physical host infrastructure 114. In some embodiments, the dedicated physical resource manager 160 can indicate how data should be segmented or otherwise distributed between the processing resources and/or memory resources, and therefore which of the optical transmitters 206A-N should be used to distribute data to the underlying physical resources which support a virtual machine (e.g., any of the virtual machines 156A-N). In some embodiments, the optical distributors 208 can include a clock-data recovery chip or circuitry that syncs and times the relay of segments of data. In some embodiments, an instance of an optical transmitter (e.g., any of the optical transmitters 206A-N) can include an optical device driver, such as but not limited to, one or more of a laser device driver and/or a light emitting diode device driver. Each of the optical transmitters 206A-N can generate and provide an optical signal corresponding to a specific wavelength via one or more optical device driver that drives a laser and/or light emitting diode at a specific wavelength. Because each of the optical transmitters 206A-N may correspond with a different dedicated communication path (e.g., the dedicated communication paths 1A-1N, 2A-2N, 3A-3N, 4A-4N), in some embodiments, each of the dedicated communication paths 1A-1N, 2A-2N, 3A-3N, 4A-4N may be associated with a specific wavelength that is provided by the corresponding optical transmitter. It is understood that the examples provided are for illustration purposes only, and therefore should not be construed as limiting in any way.

In some embodiments, the ROSA 212 can be configured to receive optical transmissions via a dedicated communication path (e.g., the dedicated communication paths 1A-1N, 2A-2N, 3A-3N, 4A-4N). In some embodiments, the ROSA 212 can include a demultiplexer 214, a plurality of optical receivers 216A-N, and a receiver amplifier 218. The demultiplexer 214 can receive the transmissions from two or more of the dedicated communication paths 1A-1N, 2A-2N, 3A-3N, 4A-4N, where the transmission may be optically multiplexed together. The demultiplexer 214 can optically separate the incoming transmissions into separate wavelengths corresponding to each of the dedicated communication paths 1A-1N, 2A-2N, 3A-3N, 4A-4N corresponding to the various processing resources and/or memory resources of the physical host servers 116A-N. The communications can be passed along from the demultiplexer 214 to the optical receivers 216A-N. In some embodiments, one or more instances of the optical receivers 216A-N can include a photodetector and/or a photonic diode that can convert the received transmissions from each of the dedicated communication paths 1A-1N, 2A-2N, 3A-3N, 4A-4N into electrical transmissions that are routed to the receiver amplifier 218, which in turn can route the communications to the dedicated physical resource manager 160 via the dedicated communication interface 220. The receiver amplifier 218 can include one or more of a transimpedance amplifier, a limiting amplifier, and/or a clock and data recovery chip that can recover the output from the optical receivers 216A-N, sync, retime, and reshape the data transmissions corresponding to each dedicated communication path so that the data package segments can be sent to the dedicated physical resource manager 160 for analysis and any other operations discussed herein. It is understood that the examples provided are for illustration purposes only, and therefore should not be construed as limiting in any way.

Figure 3:
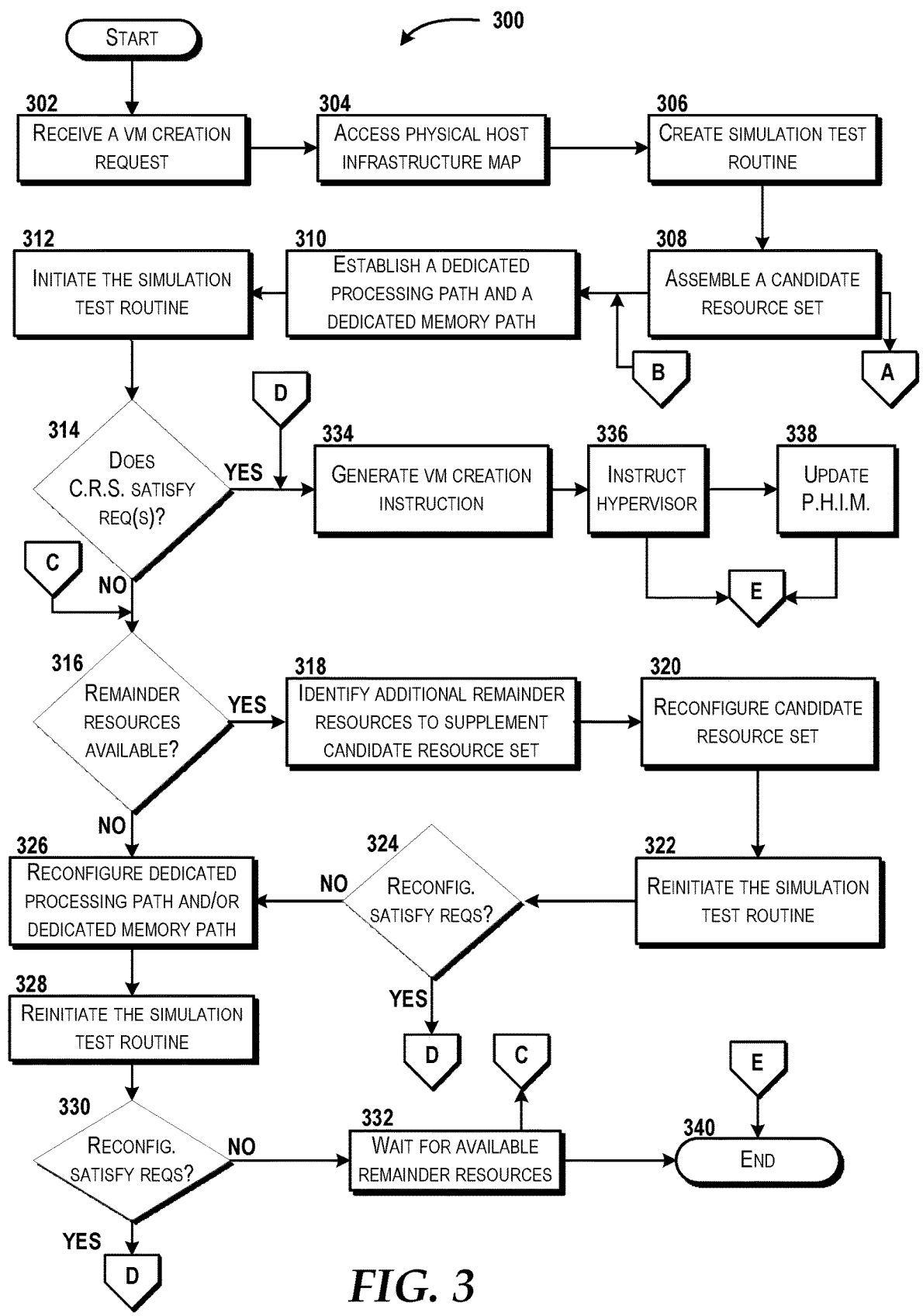
FIG. 3 is a flow diagram illustrating aspects of a method for aggregation and distribution of computing resources in a virtualized environment, according to an illustrative embodiment.
Figure 4:
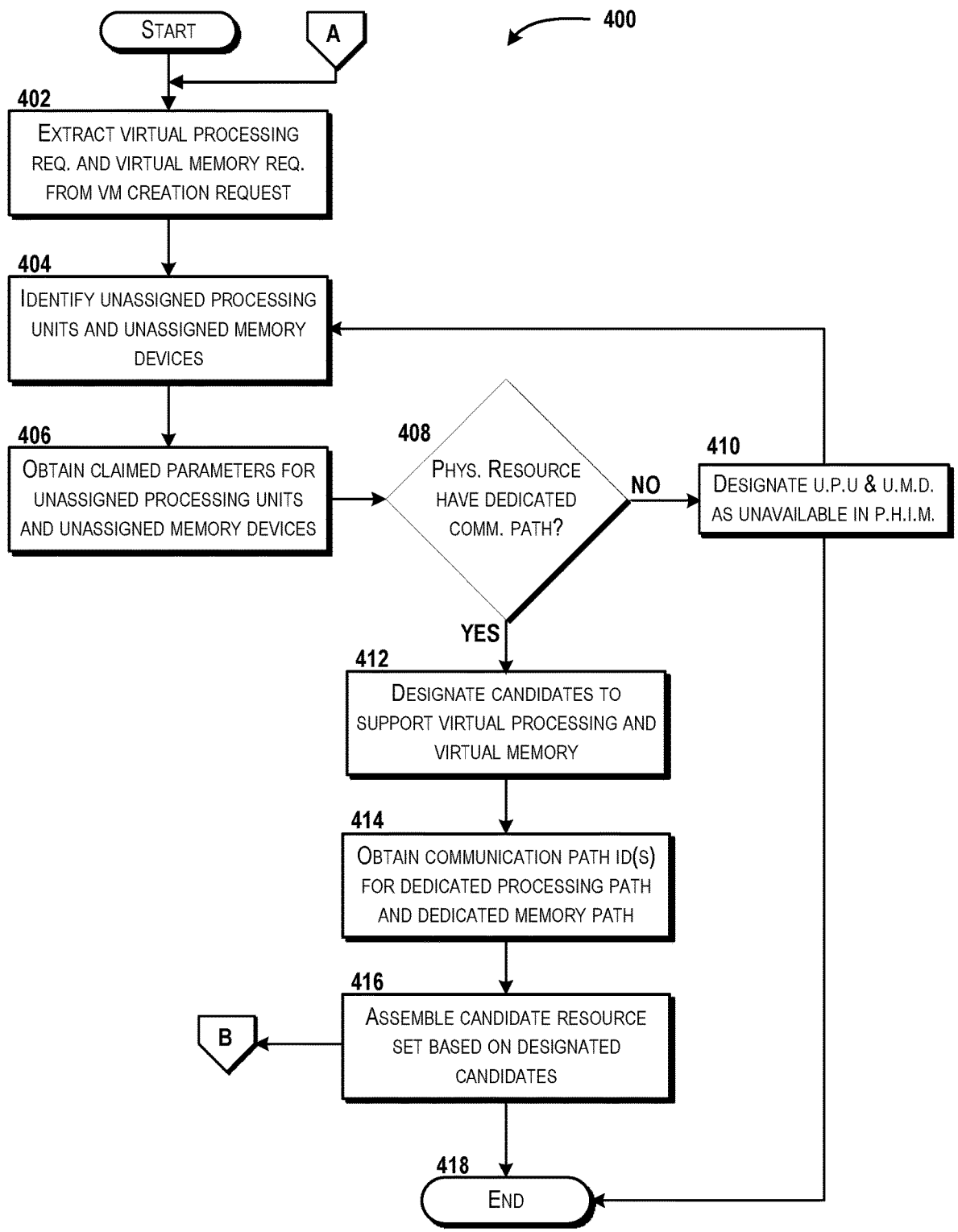
FIG. 4 is a flow diagram illustrating aspects for assembling a candidate resource set to facilitate aggregation and distribution of computing resources in virtualized environments, according to an illustrative embodiment.

Turning now to FIGS. 3 and 4, with continued reference to FIGS. 1 and 2, aspects of a method 300 dedicated optical distribution of computing resources for virtualized environments and a method 400 for assembling a candidate resource set to facilitate dedicated optical distribution of computing resources for virtualized environments will be described in detail, according to illustrative embodiments. It should be understood that each of the operations of the one or more methods disclosed herein (e.g., the method 300 and/or the method 400 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as any element within the datacenter 110 (e.g., the physical host infrastructure 114, the physical host server 116A-N, the dedicated physical resource manager 160, and/or any other element supported within the datacenter 110), and/or the network 102 to perform one or more operations and/or causing the processor to direct other components of the computing system or device to perform one or more of the operations.

For purposes of illustrating and describing the concepts of the present disclosure, the methods disclosed herein are described as being performed by one or more instance of the physical host infrastructure 114 via execution of one or more software modules (i.e., executable data processes that instruct and transform a processor) such as, for example, the dedicated physical resource manager 160 that configure one or more processors within the datacenter 110. In some embodiments, the dedicated physical resource manager 160 may be configured as a computing system that includes one or more instances of a processor and/or memory which operate within the datacenter 110. It should be understood that additional and/or alternative devices and/or network elements can, in some embodiments, provide the functionality described herein via execution of one or more modules, applications, and/or other software including, but not limited to, the other instances of the physical host servers 116A-N within and/or outside the datacenter 110. Thus, the illustrated embodiments are illustrative, and should not be viewed as being limiting in any way. The methods 300 and 400 will be described with reference to one or more of the FIGS. 1 and 2.

Turning now to FIG. 3, the method 300 begins and proceeds to operation 302, where the dedicated physical resource manager 160 can receive the virtual machine creation request 180, which can include the virtual processing requirement 181 and the virtual memory requirement 182. In some embodiments, the virtual machine creation request 180 may be received from any of the network administration controller 158, the hypervisor 154, and/or the operating system 150. In various embodiments, the virtual processing requirement 181 and/or the virtual memory requirement 182 may have been defined or otherwise established by any of the network administration controller 158, the hypervisor 154, and/or the operating system 150. In various embodiments, the virtual machine creation request 180 can request that a virtual machine (e.g., the virtual machine 156A) be created or otherwise instantiated such that various physical resources of the physical host infrastructure 114 can support virtualized processing and memory operations. In various embodiments, the dedicated physical resource manager 160 may be configured to intercept the virtual machine creation request 180 from the hypervisor 154 so that the physical resources (e.g., physical processing units and physical memory devices) can be assigned or otherwise designated by the dedicated physical resource manager 160 instead of by the hypervisor 154. As such, the dedicated physical resource manager 160 may instruct any of the hypervisor 154, the operating system 150, and/or the network administration controller 158 to route the virtual machine creation request 180 to the dedicated physical resource manager 160 prior to the creation or reconfiguration of the requested virtual machine (e.g., the virtual machine 156A).

From operation 302, the method 300 can proceed to operation 304, where the dedicated physical resource manager 160 can access the physical host infrastructure map 162 to identify which physical resources (e.g., the processing units 118A-N, 124A-N and/or the memory devices 122A-N, 128A-N) are unassigned or otherwise available to aggregate together for the support and creation (or reconfiguration) of a virtual machine (e.g., the virtual machine 156A). The physical host infrastructure map 162 can identify the remainder resources 132 that are provided by the physical host servers 116A-N within the datacenter 110. Specifically, the remainder resources 132 can include one or more processing units and/or memory devices that are unassigned or otherwise available (e.g., the unassigned processing units 120A-N, 126A-N and the unassigned memory devices 123A-N, 130A-N) for implementation and aggregation so that one or more instances of physical computing resources belonging to the remainder resources 132 can be individually activated and bundled to support the request virtual machine.

From operation 304, the method 300 can proceed to operation 306, where the dedicated physical resource manager 160 can create an instance of the simulation test routine 168 based on the virtual processing requirement 181 and the virtual memory requirement 182. For example, in some embodiments, the simulation test routine 168 can include a predefined set of computer instructions that cause one or more physical resources of the remainder resources 132 (e.g., any unassigned processing unit and/or unassigned memory device) to mimic the processing load and/or memory utilization that would occur when the virtual machine has been created, where the amount of processing load and memory utilization corresponds with the virtual processing requirement 181 and the virtual memory requirement 182.

From operation 306, the method 300 can proceed to operation 308, where the dedicated physical resource manager 160 can assemble the candidate resource set 170 using one or more physical computing resources provided by the remainder resources 132. In various embodiments, the candidate resource set 170 can include at least one instance of an unassigned processing unit (e.g., any of the unassigned processing units 120A-N, 126A-N) and at least one instance of an unassigned memory device (e.g., any of the unassigned memory devices 123A-N, 130A-N). The unassigned processing units and unassigned memory devices which are to be included in the candidate resource set 170 may be designated as a candidate processing unit or a candidate memory device, such as one of the candidate processing units 172A-N or the candidate memory devices 174A-N. Designation of the candidate processing units 172A-N and the candidate memory devices 174A-N can be based on the designated unassigned processing units and designated unassigned memory devices collectively providing enough virtual processing power and virtual memory storage (in the aggregate) to theoretically satisfy the virtual processing requirement 181 and the virtual memory requirement 182. In some embodiments, the candidate resource set 170 can be assembled based on the claimed parameters 152A-N and/or the actual parameters 153A-N, where designation of processing units and memory devices from the remainder resources 132 as candidates for the candidate resource set 170 enable the request virtual machine to be created and sustained. A particular configuration of the candidate resource set 170 (i.e., which processing units and memory devices are considered to be among the candidate processing units 172A-N and the candidate memory devices 174A-N) may be tested to confirm that the candidate resource set 170 will actually satisfy (instead of theoretically satisfy) the virtual processing requirement 181 and the virtual memory requirement 182, as further discussed below. In some embodiments, the method 300 may proceed to one or more operations discussed with respect to the method 400 illustrated in FIG. 4. It is understood that the examples provided are for illustration purposes only, and should not be construed as limiting in any way.

From operation 308, the method 300 can proceed to operation 310, where the dedicated physical resource manager 160 can establish the dedicated processing path 176 and the dedicated memory path 178 for the candidate resource set 170. For example, the dedicated physical resource manager 160 can determine which of the communication path identifiers 165A-N correspond with the candidate processing units 172A-N and the candidate memory devices 174A-N, and once identified, assign the selected instances from the communication path identifiers 165A-N to the respective dedicated processing path 176 and the dedicated memory path 178. By this, the dedicated processing path 176 can include a plurality of dedicated communication paths that provide direct connections to, from, and/or between unassigned processing units of the candidate resource set 170, and thus are reserved exclusively to support virtual processing of the request virtual machine (e.g., the virtual machine 156A). The dedicated processing path 176 may route data via the dedicated processing bus hub 140 that is external to the physical host servers 116A-N, and enables (optical) communicative coupling directly between individual processing units, without having to traverse a shared communication bus internal to one of the physical host server 116A-N. Similarly, the dedicated memory path 178 can include a plurality of dedicated communication paths that provide direct connections to, from, and/or between unassigned memory devices of the candidate resource set 170, and thus are reserved exclusively to support virtual processing of the request virtual machine (e.g., the virtual machine 156A). The dedicated memory path 178 may route data via the dedicated memory bus hub 144 that is external to the physical host servers 116A-N, and enables (optical) communicative coupling directly between individual memory device, without having to traverse a shared communication bus internal to one of the physical host server 116A-N.

From operation 310, the method 300 can proceed to operation 312, where the dedicated physical resource manager 160 can initiate the simulation test routine 168 on the candidate resource set 170 via the dedicated processing path 176 and the dedicated memory path 178. Specifically, the simulation test routine 168 can be activated and executed on the processing units and memory devices corresponding to the candidate processing units 172A-N and candidate memory devices 174A-N, respectively. The simulation test routine 168 can yield one or more instances of the actual parameters 153A-N which correspond to the candidate processing units 172A-N and candidate memory devices 174A-N, thereby indicating whether the claimed parameters 152A-N are accurate and whether the candidate resource set 170 can satisfy the virtual processing requirement 181 and the virtual memory requirement 182.

From operation 312, the method 300 can proceed to operation 314, where the dedicated physical resource manager 160 can determine whether the candidate resource set 170 satisfies the virtual processing requirement 181 and the virtual memory requirement 182 for the virtual machine 156A. For example, as a result of the simulation test routine 168, the dedicated physical resource manager 160 may be provided with one or more instances of the actual parameters 153A-N, such as for actual processing power and actual data storage capacity. The dedicated physical resource manager 160 can determine whether the unassigned processing units will cumulatively provide enough processing power (in the aggregate) to satisfy the virtual processing requirement 181, and whether the unassigned memory devices will cumulatively provide enough data storage capacity to satisfy the virtual memory requirement 182. In various embodiments, once the dedicated physical resource manager 160 determines that both the virtual processing requirement 181 and the virtual memory requirement 182 are satisfied, then the method 300 can proceed along the YES path to operation 334, which is discussed below. If the dedicated physical resource manager 160 determines that either the virtual processing requirement 181 or the virtual memory requirement 182 are not satisfied, then the method 300 can proceed along the NO path to operation 316. For clarity purposes, a discussion following the NO path to operation 316 will be provided first, followed by a discussion along the YES path to operation 334, which will be provided below.

At operation 316, the dedicated physical resource manager 160 can determine whether any of the remainder resources 132 are available to supplement the candidate resource set 170 and remedy the deficiency so that both of the virtual processing requirement 181 and the virtual memory requirement 182 can be satisfied. For example, in an embodiment, the candidate resource set 170 may include the unassigned processing units 120A, 126A, and the unassigned memory devices 123A, 130A. The dedicated physical resource manager 160 can determine that within the remainder resources 132, the unassigned processing units 120B-N, 126B-N, and the unassigned memory devices 123B-N, 130B-N remain available for use. In some embodiments, if the needed physical resource (e.g., either a processing unit or memory device) is unassigned and available to supplement the candidate resource set 170, then the method 300 can proceed along the YES path to operation 318, which will be discussed below. In some embodiments, the remainder resources 132 (beyond those already included in the current candidate resource set 170) may not be available, and therefore none of the needed physical resources provide by the physical host servers 116A-N can be used to supplement the current configuration of the candidate resource set 170. Therefore, in an embodiment, if the remainder resources 132 (besides those already included in the candidate resource set 170) are not available, the method 300 may proceed along the NO path to operation 326. For clarity purposes, a discussion along the YES path to operation 318 will be provided first, followed by a discussed of operation 326 provided below.

At operation 318, the dedicated physical resource manager 160 may identify the additional instances of unassigned resources from the remainder resources 132 that can be used to supplement the candidate resource set 170. For example, if the current configuration of the candidate resource set 170 does not satisfy the virtual processing requirement 181 because another 1.2 GHz/sec processing power is needed, then the dedicated physical resource manager 160 can determine that the unassigned processing unit 120B provides 1.8 GHz/sec (e.g., based on one of the claimed parameters 152A-N or actual parameters 153A-N), which is more than the current deficiency.

From operation 318, the method 300 can proceed to operation 320, where the dedicated physical resource manager 160 can reconfigure the candidate resource set 170 to include another remainder resource, such as any unassigned processing unit or unassigned memory device from the remainder resources 132 which has not already been included in the candidate resource set. In some embodiments, reconfiguring the candidate resource set 170 may occur in response to the dedicated physical resource manager 160 determining that the candidate resource set 170 does not satisfy at least one of the virtual processing requirement 181 or the virtual memory requirement 182 for the virtual machine 156A, and therefore the reconfiguration may specifically address the corresponding deficiency. Therefore, in various embodiments, reconfiguration of the candidate resource set 170 can include supplementing the candidate processing units 172A-N and/or the candidate memory devices 174A-N with the identified additional remainder resource in order to satisfy the associated deficiency, such as by adding an unassigned processing unit from the remainder resources 132 to satisfy the virtual processing requirement 181 and/or adding an unassigned memory device from the remainder resources 132 to satisfy the virtual memory requirement 182. For example, if the virtual processing requirement 181 has not been met, then the dedicated physical resource manager 160 can reference the identifier from the processing units identifiers 164A-N which corresponds to processing unit which should cure the deficiency, such as the unassigned processing unit 120B which can be designated as one of the candidate processing units 172A-N.

From operation 320, the method 300 can proceed to operation 322, where the dedicated physical resource manager 160 can reinitiate the simulation test routine 168 to confirm that the reconfiguration of the candidate resource set 170 (e.g., by supplementing the candidate resource set 170 with additional processing units and/or memory devices based on whether the deficiency corresponds with the virtual processing requirement 181 or the virtual memory requirement 182).

From operation 322, the method 300 can proceed to operation 324, where, the dedicated physical resource manager 160 can determine whether reconfiguration of the candidate resource set 170 enables the virtual processing requirement 181 or the virtual memory requirement 182 to be satisfied. After performing the simulation test routine 168 if both the virtual processing requirement 181 and the virtual memory requirement 182 are satisfied in response to reconfiguration of the candidate resource set 170, then the method 300 may proceed from operation 324 along the YES path to operation 334, which will be discussed below in further detail. If either the virtual processing requirement 181 or the virtual memory requirement 182 are not satisfied in response to reconfiguration of the candidate resource set 170, then the method 300 may proceed from operation 324 along the NO path to operation 326. As discussed above in operation 316, in some embodiments, additional remainder resources may not be available because additional instances of the unassigned processing units and/or unassigned memory devices (besides those currently included in the candidate resource set 170) have been or are in the process of being assigned and thus are currently unavailable for allocation and consideration for inclusion as part of the candidate resource set 170. Therefore, in various embodiments, if either additional remainder resources are not available and/or both of the virtual processing requirement 181 and the virtual memory requirement 182 are not satisfied, then the method 300 may proceed to operation 326 (from either operation 316 or operation 324). In some embodiments, the method 300 may perform operation 326 irrespective of whether one or more instances of the remainder resources 132 are available. It is understood that the examples provided are for illustration purposes only, and therefore should not be construed as limiting.

At operation 326, the dedicated physical resource manager 160 can reconfigure at least one of the dedicated processing path 176 or the dedicated memory path 178 for the candidate resource set 170. In some embodiments, reconfiguring either the dedicated processing path 176 or the dedicated memory path 178 can occur in response to determining that the candidate resource set 170 does not satisfy at least one of the virtual processing requirement 181 or the virtual memory requirement 182 for the requested virtual machine (e.g., the virtual machine 156A). In various embodiments, reconfiguring the dedicated processing path 176 or the dedicated memory path 178 can include identifying one or more dedicated communication paths that could be activated and used to provide a more direct route to, from, and/or between physical resources. For example, in an embodiment, if the dedicated processing path 176 currently includes activation of the dedicated communication paths 1A and 2A to the unassigned processing units 120A, 126A, respectively (because those may be included in the candidate resource set 170), then the dedicated physical resource manager 160 can reconfigure the dedicated processing path 176 by including and activating the dedicated communication path 6A that directly connects the unassigned processing unit 120A to the unassigned processing unit 126A, thereby reducing processing latency and potentially improving the actual processing power indicated by a corresponding one of the actual parameters 153A-N. In this example, dedicated communication path 6A can correspond with one of the communication path identifiers 165A-N, and thus the particular communication path identifier can be referenced by the dedicated processing path 176.

From operation 326, the method 300 can proceed to operation 328, where, the dedicated physical resource manager 160 can reinitiate the simulation test routine 168 to obtain actual parameters (e.g., any of the actual parameters 153A-N) corresponding to the processing units and memory devices that are included in the candidate resource set 170.

From operation 328, the method 300 can proceed to operation 330, where the dedicated physical resource manager 160 can determine whether the virtual processing requirement 181 and the virtual memory requirement 182 are satisfied, specifically in response to, and based on, reconfiguring at least one of the dedicated processing path 176 or the dedicated memory path 178. In various embodiments, reconfiguring at least one of the dedicated processing path 176 or the dedicated memory path 178 may reduce the latency by which data and communication are transferred to, from, and/or within the datacenter 110, and therefore can improve the actual parameters 153A-N so that the candidate resource set 170 can satisfy the virtual processing requirement 181 and the virtual memory requirement 182 for the virtual machine 156A. Therefore, in some embodiments, if both the virtual processing requirement 181 and the virtual memory requirement 182 are satisfied by the candidate resource set 170 and use of the dedicated processing path 176 and the dedicated memory path 178, then the method 300 can proceed along the YES path from operation 330 to operation 334, which will be discussed in further detail below. In some embodiments, if both the virtual processing requirement 181 and the virtual memory requirement 182 are not satisfied, then the method 300 can proceed from operation 330 along the NO path to operation 332. For clarity, a discussion of the method 300 proceeding along the NO path to operation 332 will be provided first, followed by a discussion of the method 300 proceeding along the YES path to operation 334.

At operation 332, the dedicated physical resource manager 160 can wait for available remainder resources within the physical host servers 116A-N, such as by monitoring the physical host infrastructure map 162 to detect a change in status to "unassigned" for any of the processing units or memory devices (depending on which requirement is not satisfied).

In some embodiments, the method 300 may proceed from operation 332 to operation 316, discussed above, so as to continue to check whether additional physical computing resources from the remainder resources 132 are available to satisfy the virtual processing requirement 181 and/or the virtual memory requirement 182. In some embodiments, from operation 332, the method 300 can proceed to operation 340, where the method 300 may end. In some embodiments, the method 300 may proceed from operation 332 to operation 334, which is discussed below.

In various embodiment, the method 300 may proceed to operation 334, where the dedicated physical resource manager 160 can generate the virtual machine creation instruction 184 that can identify the candidate resource set 170, the dedicated processing path 176, and the dedicated memory path 178 that should be used to creation the virtual machine 156A. Specifically, the virtual machine creation instruction 184 can identify the processing units and memory devices that are included or otherwise designated within the candidate processing units 172A-N and candidate memory devices 174A-N, respectively. Similarly, the dedicated processing path 176 and the dedicated memory path 178 can indicate the collection of separate dedicated communication paths that are used exclusively for data processing (in the case of the dedicated processing path 176) or data storage (in the case of the dedicated memory path 178). In some embodiments, the virtual machine creation instruction 184 can instruct the hypervisor 154 to ignore the claimed parameters 152A-N and use the physical resources indicated by the candidate resource set 170.

From operation 334, the method 300 may proceed to operation 336, where the dedicated physical resource manager 160 can instruct the hypervisor 154 to create the virtual machine 156A using the candidate resource set 170, the dedicated processing path 176, and the dedicated memory path 178, specifically by providing the virtual machine creation instruction 184 to the hypervisor 154. In various embodiments, instructing the hypervisor 154 to create the virtual machine 156A using the candidate resource set 170 can occur in response to determining that candidate resource set 170 satisfies the virtual processing requirement 181 and the virtual memory requirement for the virtual machine 156A as discussed above.

In some embodiments, the method 300 may proceed from operation 336 to operation 340, where the method 300 may end. In some embodiments, the method 300 may proceed from operation 336 to operation 338, where the dedicated physical resource manager 160 can update the physical host infrastructure map 162 based on implementation of the candidate resource set 170 to create the virtual machine 156A. Specifically, processing units and the memory devices identified as candidates in the candidate resource set 170 are being put into use, and therefore are no longer considered to be unassigned. As such, the physical host infrastructure map 162 can reflect the change in status by indicating that the resources identified in the candidate resource set 170 are no longer "unassigned," and therefore no longer belong to, or are otherwise considered to be, a part of the remainder resources 132.

From operation 338, the method 300 may proceed to operation 340, where the method 300 may end.

Turning now to FIG. 4, the method 400 for assembling a candidate resource set to facilitate dedicated optical distribution of computing resources for virtualized environments is provided, according to an illustrated embodiment. In some embodiments, one or more operations of the method 400 may support or otherwise be included to facilitate the operation of the method 300. For example, in some embodiments, one or more of the operations of the method 400 can follow or otherwise be performed in relation to operation 308 discussed above with respect to the method 300.

In various embodiments, the method 400 can begin and proceed to operation 402, where the dedicated physical resource manager 160 can extract the virtual processing requirement 181 and the virtual memory requirement 182 from the virtual machine creation request 180. In some embodiments, the hypervisor 154 and/or the operating system 150 may include, or otherwise point to, one or more instances of the claimed parameters 152A-N to indicate what the alleged (or claimed) capabilities of one or more physical resources from the perspective of the operating system 150 and/or the hypervisor 154 are. Because the hypervisor 154 may not have root-level access to a kernel of one or more of the physical host servers 116A-N, the hypervisor 154 may defer the selection, designation, and allocation of physical computing resources to the dedicated physical resource manager 160, even in instances where the operating system 150 has requested that the hypervisor 154 create a virtual machine (e.g., the virtual machine 156A).

From operation 402, the method 400 can proceed to operation 404, where the dedicated physical resource manager 160 can identify which of the remainder resources 132 are available and unallocated within the physical host infrastructure. Specifically, the dedicated physical resource manager 160 can identify unassigned processing units (e.g., any of the unassigned processing units 120A-N, 126A-N) and/or unassigned memory devices (e.g., any of the unassigned memory devices 123A-N, 130A-N) that could be implemented to support the creation and execution of a virtual machine, such as the virtual machine 156A.

From operation 404, the method 400 can proceed to operation 406, where the dedicated physical resource manager 160 can obtain the claimed parameters 152A-N which correspond to the remainder resources 132 that are identified (e.g., one or more of the claimed parameters 152A-N that correspond with any of the unassigned processing units 120A-N, 126A-N and/or the unassigned memory devices 123A-N, 130A-N).

From operation 406, the method 400 can proceed to operation 408, where the dedicated physical resource manager 160 can determine whether each of the remainder resources 132 corresponds with a separate instance of the dedicated communication port 119 and thus a dedicated communication path. By this, the dedicated physical resource manager 160 can isolate only those physical resources (i.e., unassigned processing units and unassigned memory devices in the remainder resources 132) that can be accessed directly and individually, without having data pass through a shared bus on a physical host server (e.g., a communication bus that is internal to any of the physical host servers 116A-N and would be shared by other processing units and/or memory devices). Stated differently, the dedicated physical resource manager 160 can determine whether a physical resource can be accessed via a communication path that is dedicated solely to the particular instance of the physical resource, such as via any of the dedicated communication paths 1A-1N, 2A-2N, 3A-3N, 4A-4N, 5A-5N, and/or 6A-6N. In various embodiments, an instance of the dedicated communication port 119 (e.g., an optical port) can be implemented on each end of a dedicated communication path. Therefore, if a physical resource is associated with an instance of the dedicated communication port 119, then the physical resource will be available via a dedicated communication path (e.g., one instance of the dedicated communication port 119 at the unassigned processing unit 120A and another instance of the dedicated communication port 119 at the dedicated processing bus hub 140, with the dedicated communication path 1A providing communicative coupling therebetween). As such, one or more of the dedicated communication paths can be grouped together to form or otherwise create an instance of the dedicated processing path 176 or the dedicated memory path 178.

In various embodiments, if a physical resource (e.g., any unassigned processing unit and/or unassigned memory device) cannot be accessed directly via an instance of the dedicated communication port 119 and a dedicated communication path, then the method 400 may proceed along the NO path to operation 410, where the dedicated physical resource manager 160 can remove the physical resource from being one of the remainder resources 132 by designating, within the physical host infrastructure map 162, the particular unassigned processing unit or unassigned memory device as "unavailable." By this, the particular processing unit and/or memory device will not be eligible for consideration to support the creation and execution of a virtual machine, specifically because that particular resource cannot be individually accessed, and thus would not be aggregated with other resources from the remainder resources 132. In some embodiments, the method 400 may proceed from operation 410 to operation 404 discussed above, where one or more of the operations 404, 406, and/or 408 may be repeated. In some embodiments, the method 400 may proceed from operation 410 to operation 418, where the method 400 can end.

Returning to operation 408, in some embodiments, an unassigned processing unit and/or an unassigned memory device has a dedicated communication path, and thus is eligible to be aggregated for assembly into the candidate resource set 170, then the method 400 may proceed along the YES path to operation 412. At operation 412, the dedicated physical resource manager 160 can designate, from among the remainder resources 132, candidates to support virtual processing operations and candidates to support virtual memory operations in order to attempt to satisfy the virtual processing requirement 181 and the virtual memory requirement 182, respectively. For example, the dedicated physical resource manager 160 can select one or more of the unassigned processing units 120A-N, 126A-N for designation as the candidate processing units 172A-N. Similarly, the dedicated physical resource manager 160 can select one or more of the unassigned memory devices 123A-N, 130A-N for designation as the candidate memory devices 174A-N. The selection and designation of the candidate processing units 172A-N and/or candidate memory devices 174A-N may initially be based on an instance of one of the claimed parameters 152A-N corresponding to the particular unassigned processing unit or unassigned memory device. In some embodiments, the selection and designation of the candidate processing units 172A-N and/or the candidate memory devices 174A-N may be based on the last recorded value provided by an instance from the actual parameters 153A-N corresponding to the particular unassigned processing unit or unassigned memory device. The designation of the candidate processing units 172A-N and/or the candidate memory devices 174A-N can be based on designation of the least amount of processing units and memory devices that can be used to satisfy both the virtual processing requirement 181 and the virtual memory requirement 182.

From operation 412, the method 400 can proceed to operation 414, where the dedicated physical resource manager 160 can identify the dedicated communication paths which correspond to the unassigned processing units and unassigned memory devices that are designated and included in the candidate processing units 172A-N or the candidate memory devices 174A-N, respectively. Specifically, the physical host infrastructure map 162 may indicate which of the dedicated communication path identifiers 165A-N correspond with either of the processing unit identifiers 164A-N and/or memory device identifiers 166A-N for a particular physical resource. For example, in an embodiment, the unassigned processing unit 120A may be designated for inclusion in the candidate processing units 172A-N. The physical host infrastructure map 162 may indicate that the unassigned processing unit 120A corresponds with the processing unit identifier 164A. The physical host infrastructure map 162 may also indicate that the processing unit identifier 164A is associated with the communication path identifier 165A, which can be an identifier for the dedicated communication path 1A between the unassigned processing unit 120A and the dedicated processing bus hub 140. It is understood that the physical host infrastructure map 162 may also indicate any other identifiers of communication paths which are associated with a particular physical resource, such as the unassigned processing unit 120A. As such, two or more dedicated communication paths may be identified as being associated with a particular physical resources, such as instances from among the communication path identifiers 165A-N that correspond to the dedicated communication path 1A and 6A for the unassigned processing unit 120A. It is understood that the examples provided are for illustration purposes only, and therefore should not be construed as limiting in any way. In various embodiments, each dedicated communication path to a physical resource can be identified, and the corresponding one or more of the communication path identifiers 165A-N can be obtained, to enable and facilitate the establishment the dedicated processing path 176 and the dedicated memory path 178.

From operation 414, the method 400 can proceed to operation 416, where the dedicated physical resource manager 160 can assemble the candidate resource set 170 based on designating candidates from the remainder resources 132, such as provided by the candidate processing units 172A-N and the candidate memory devices 174A-N. Each physical resource that is selected or otherwise designated as one of the candidate processing units 172A-N or the candidate memory devices 174A-N can be identified in the candidate resource set 170, such as by the dedicated physical resource manager 160 indicating the identifier for the physical resource (i.e., from among the processing unit identifiers 164A-N and the memory device identifiers 166A-N) that is included as a candidate to support the creation of a virtual machine. By this, the candidate resource set 170 can indicate which of the unassigned processing units 120A-N, 126A-N, and the unassigned memory devices 123A-N, 130A-N are selected or otherwise designated as part of the candidate processing units 172A-N or the candidate memory devices 174A-N. In some embodiments, the first iteration of the assembling the candidate resource set 170 may satisfy the virtual processing requirement 181 and the virtual memory requirement 182, although this may not necessarily be the case for every embodiment. In some embodiments, the candidate resource set 170 may be reassembled or otherwise reconfigured to satisfy the virtual processing requirement 181 and the virtual memory requirement 182, such as by the addition or subtraction of various physical resources so as to facilitate the creation and execution of a virtual machine while optimizing the amount of physical resources implemented to do so.

In some embodiments, the method 400 may proceed from operation 416 to one or more operations discussed with respect to the method 300, such as the operation 310. In some embodiments, the method 400 may proceed from operation 416 to operation 418, where the method 400 can end.

Figure 5:
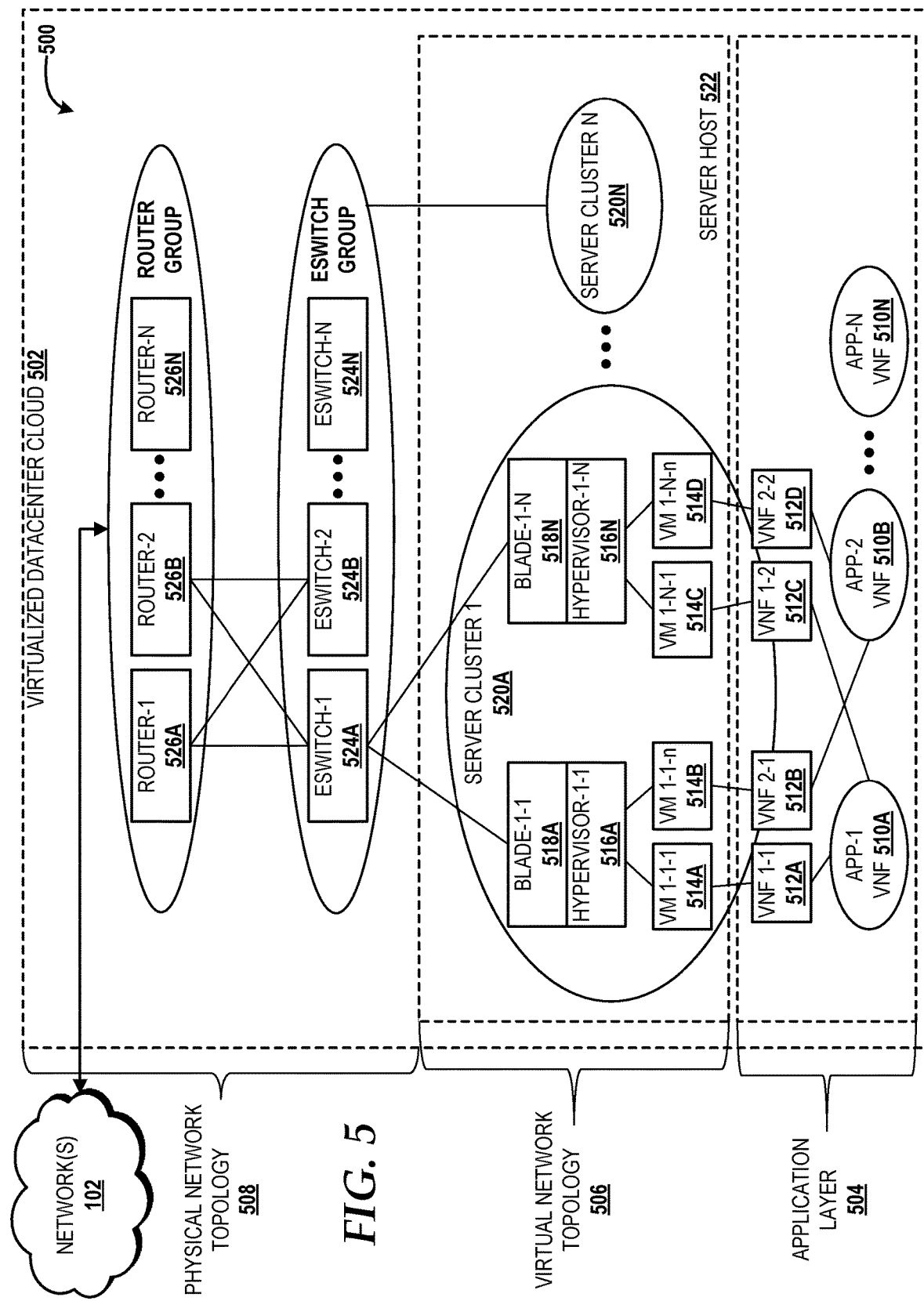
FIG. 5 is a diagram illustrating a network topology for a virtualized datacenter cloud capable of implementing aspects of the concepts and technologies described herein according embodiments of the present disclosure.

Turning now to FIG. 5, a network topology 500 for a virtualized datacenter cloud 502 will be described, according to an illustrative embodiment. In some embodiments, at least a portion of the datacenter 110 can be configured according one or more aspects of the network topology 500. The illustrated network topology 500 includes three layers: an application ("APP") layer 504, a virtual network topology layer 506, and a physical network topology layer 508. The APP layer 504 can include one or more application virtualized network function ("VNFs") 510A-510N, each of which can be divided to one or more sub-VNFs 512A-512D (referred to herein collectively as "sub-VNFs 512") to be executed by one or more VMs 514A-514D (referred to herein collectively as "VMs 514"). In the context of the concepts and technologies disclosed herein, the VNFs 510A-510N can include virtual processing network functions for one or more virtual machines 156A-N of the datacenter 110.

The virtual network topology layer 506 includes the VMs 514, one or more hypervisors 516, and one or more server modules ("blades") 518A-518N (referred to herein collectively as "blades 518"). Each blade 518 can support one hypervisor 516A-516N (referred to herein collectively as "hypervisors 516") that, in turn, can manage one or more of the VMs 514. The blades 518 provide computing capacity to support the VMs 514 carrying the sub-VNFs 512. The hypervisors 516 provide resource management among the VMs 514 supported thereby. One or more logical server cluster 520A-520N (referred to herein collectively as "server clusters 520") is created for resource allocation and reallocation purposes, which includes the blades 518 in the same instance of the server host 522. Each instance of the server host 522 includes one or more of the logical server clusters 520.

The physical network topology layer 508 includes an Ethernet switch ("ESwitch") group, including one or more ESwitches 524A-524N (referred to herein collectively as "ESwitches 524"). The physical network topology layer 508 also includes a router group, including one or more routers 526A-526N (referred to herein collectively as "routers 526"). The ESwitch group provides traffic switching function among the blades 518. The router group provides connectivity for traffic routing between the virtualized datacenter cloud 502 and the network 102. The routers 526 may or may not provide multiplexing functions, depending upon network design. In some embodiments, the physical network topology layer 508 can correspond with one or more instances of the physical host servers 116A-N.

The virtual network topology layer 506 is dynamic by nature, and as such, the VMs 514 can be moved among the blades 518 as needed. The physical network topology layer 508 is more static, and as such, no dynamic resource allocation is involved in this layer. Through such a network topology configuration, the association among application VNFs 510, the VM 514 supporting the application VNFs 510, and the blades 518 that hosts the VM 514 can be determined. In some embodiments, the operating system 150, the virtual machines 156A-N, and/or the network administration controller 158 can operate within the virtual network topology layer 506.

In the illustrated example, a first VNF is divided into two sub-VNFs, VNF 1-1 512A and VNF 1-2 512C, which is executed by VM 1-1-1 514A and VM 1-N-1 514C, respectively. The VM 1-1-1 514A is hosted by the blade 1-1 518A and managed by the hypervisor 1-1 516A in the server cluster 1 520A of the server host 522. Traffic switching between the blade 1-1 518A and the blade 1-N 518N is performed via ESwitch-1 524A. Traffic communications between the ESwitches 524 and the network 102 can be performed via the routers 526. In this example, the VM 1-1 514A can be moved from the blade 1-1 518A to the blade 1-N 518N for VM live migration if the blade 1-1 518A is detected to have difficulty to support the VNF 1-1 512A performance requirements and the blade 1-N 518N has sufficient capacity and is available to support the VNF 1-1 512A performance requirements. The virtual network topology layer 506 is dynamic by nature due to real-time resource allocation/reallocation capability of a cloud software defined network ("SDN"). The association of application, VM, and blade host in this example is the VNF 1-1 512A is executed on the VM 1-1-1 514A hosted by the blade 1-1 518A in the server cluster 1 520A. In some embodiments, one or more virtual applications and/or virtual services of the datacenter 110 may be configured to operate within or otherwise correspond with the APP layer 504.

Figure 6:
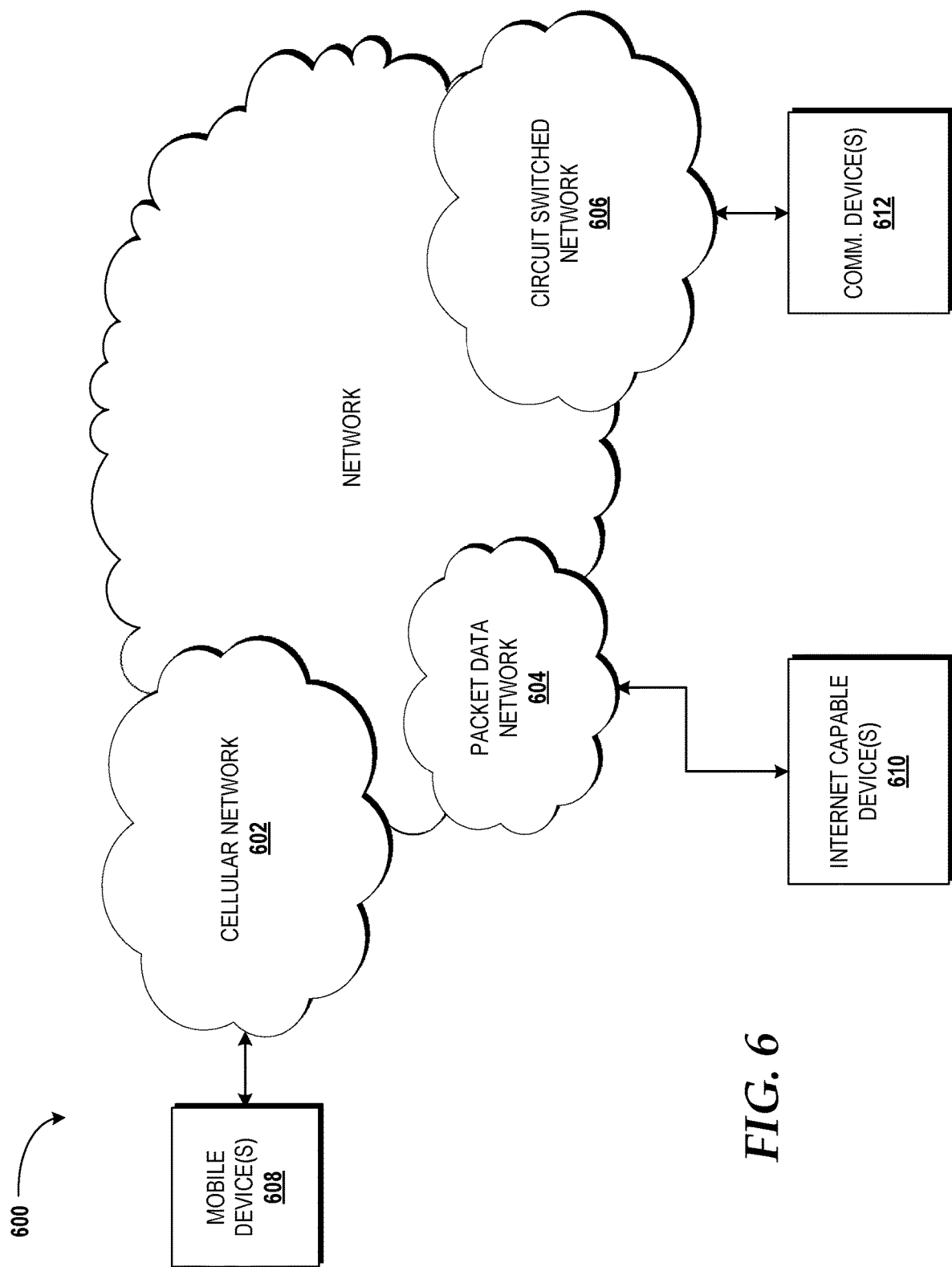
FIG. 6 is a diagram illustrating an example network capable of implementing aspects of the embodiments discussed herein.

Turning now to FIG. 6, details of a network 600 are illustrated, according to an illustrative embodiment. In some embodiments, one or more of the network 102 and/or the network 818 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs (i.e., network access points that provide 5G technology and/or otherwise conform to New Radio standards or future standards), base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, the network 102 of FIG. 1 can operate, at least in part, as the packet data network 604 and/or as or in cooperation with the cellular network 602.

The mobile communications device 608, such as, for example, a cellular telephone, a mobile terminal, a PDA, a laptop computer, a handheld computer, and combinations thereof, can be operatively connected to the cellular network 602. In some embodiments, an instance of the client device 106 can be configured as the mobile communications device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. Additionally, or alternatively, the cellular network 602 may also be compatible with 4G and evolved mobile communications standards such as LTE, LTE-Advanced, LTE-Advanced Pro, or the like, as well as future mobile standards, including but not limited to 5G and New Radio standards and technology.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (e.g., a "browser") for executing a web page in a format readable by the browser or other software such as executable applications. Other files and/or data may be accessible via "links" and/or pointers in the retrieved files, as is understood by one of skill in the technology. In some embodiments, the packet data network 604 includes or is in communication with the Internet. In some embodiments, the at least some of the network 102 can be configured as a packet data network, such as the packet data network 604. The circuit switched network 606 includes various hardware and software for providing circuit switched communications. The circuit switched network 606 may include, or may be, what is often referred to as a POTS. In some embodiments, the at least some of the network 102 also can be configured as a circuit switched network, such as the circuit switched network 606. The functionality of a circuit switched network 606 or other circuit-switched network are understood by one of skill in the technology and therefore will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. In some embodiments, the internet-capable devices 610 can include one or more instances of the client devices 106 and one or more network elements of the datacenter 110. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the network 102 and/or the datacenter 110 can be performed by the cellular network 602, the packet data network 604, and/or the circuit switched network 606, alone or in combination with other networks, network elements, and the like, according at least to aspects of the features and operations discussed herein.

Figure 7:
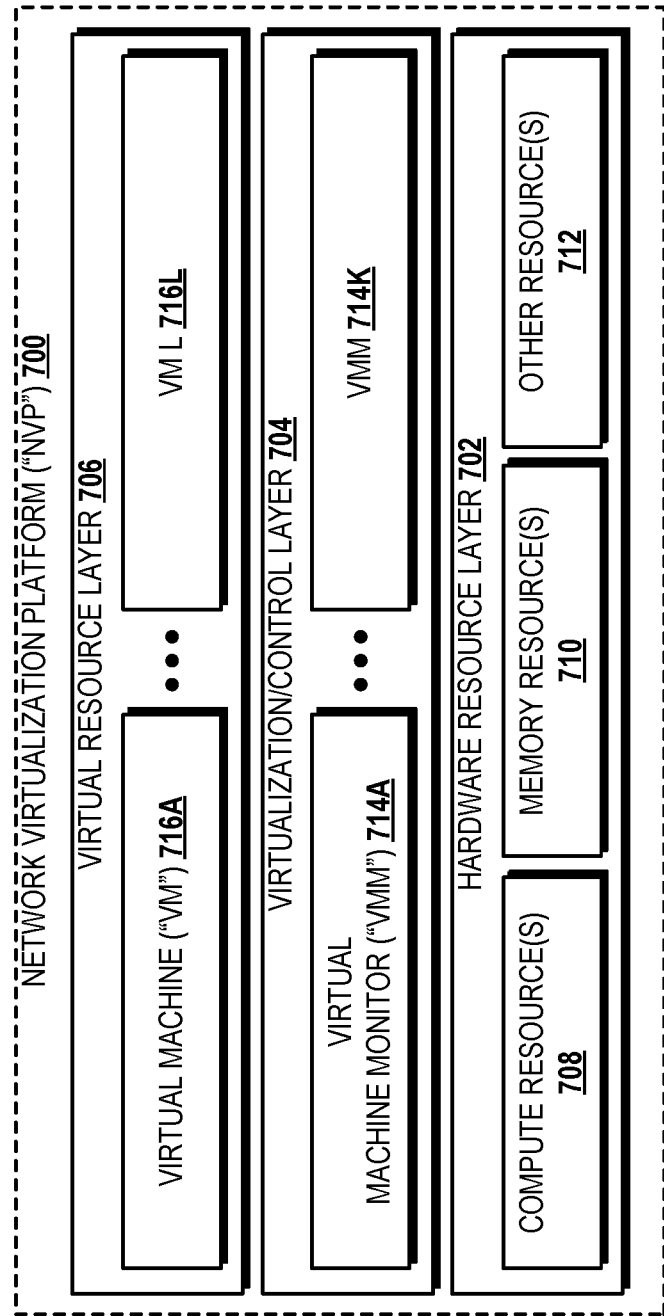
FIG. 7 is a block diagram illustrating a network virtualization platform ("NVP") capable of implementing aspects of the embodiments presented herein.

Turning now to FIG. 7, a block diagram illustrating an illustrative network virtualization platform ("NVP") 700 that can be used to implement, at least in part, the datacenter 110 and/or at least a portion thereof, introduced above in FIG. 1 will be described, according to an illustrative embodiment. For example, in some embodiments, one or more instances of one of the physical host servers 116A-N, the processing units 118A-N, 124A-N, the memory devices 122A-N, 128A-N, the operating system 150, the dedicated physical resource manager 160, the physical host infrastructure 114, the hypervisor 154, the SDN gateway 112, and/or other network elements of the datacenter 110 can be implemented via the NVP 700. The illustrated NVP 700 includes a hardware resource layer 702, a virtualization/control layer 704, and a virtual resource layer 706 that work together to perform operations as will be described in detail herein. The hardware resource layer 702 provides hardware resources, which, in the illustrated embodiment, include one or more compute resources 708, one or more memory resources 710, and one or more other resources 712. In some embodiments, the hardware resource layer 702 can correspond with an embodiment of an instance of one of the physical host server 116A-N of the datacenter 110.

The compute resource(s) 708 can include one or more hardware components that perform computations to process data, and/or to execute computer-executable instructions of one or more application programs, operating systems, and/or other software, to provide, at least in part, any services or composition of services described herein. In some embodiments, the processing units 118A-N, 124A-N can correspond with one or more instances of the compute resources 708. In some embodiments, the compute resources 708 may be referred to as processing resources. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the memory devices 122A-N, 128A-N can correspond with the memory resources 710. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures or combinations thereof, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resource(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors;" hereinafter, collectively "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706. In some embodiments, one or more instances of the physical host servers 116A-N of the physical host infrastructure 114 can provide the VMMs 714.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). It should be understood, however, that other container technologies can be used and are contemplated. It is understood that as used herein, the term "abstractions" (and variants thereof) is to be interpreted within the realm of networking and computer engineered systems, specifically as a way to describe a layered computer implementation to transform physical, non-generic devices so as to veil an end user from viewing the complexity of network architecture that is executing at lower levels, thereby enabling the transformation of particular machines and implementation of concepts and technologies discussed herein. In no manner shall the term "abstractions" (or variants thereof), be used to interpret or construe the claims in such a way as being directed to an abstract idea or any other judicial exception or non-patent eligible subject matter. In the illustrated embodiment, the virtual resource layer 706 includes VMs 716A-716L (hereinafter, collectively "VMs 716"). The VMs 716 can execute instructions to provide, at least in part, any services or composition of services described herein, such as but not limited to the dedicated physical resource manager 160 and/or the network administration controller 158. In some embodiments, at least one or more of the virtual machines 156A-N can be configured to operate as one or more of the VMs 716 within the operating environment 100.

Figure 8:
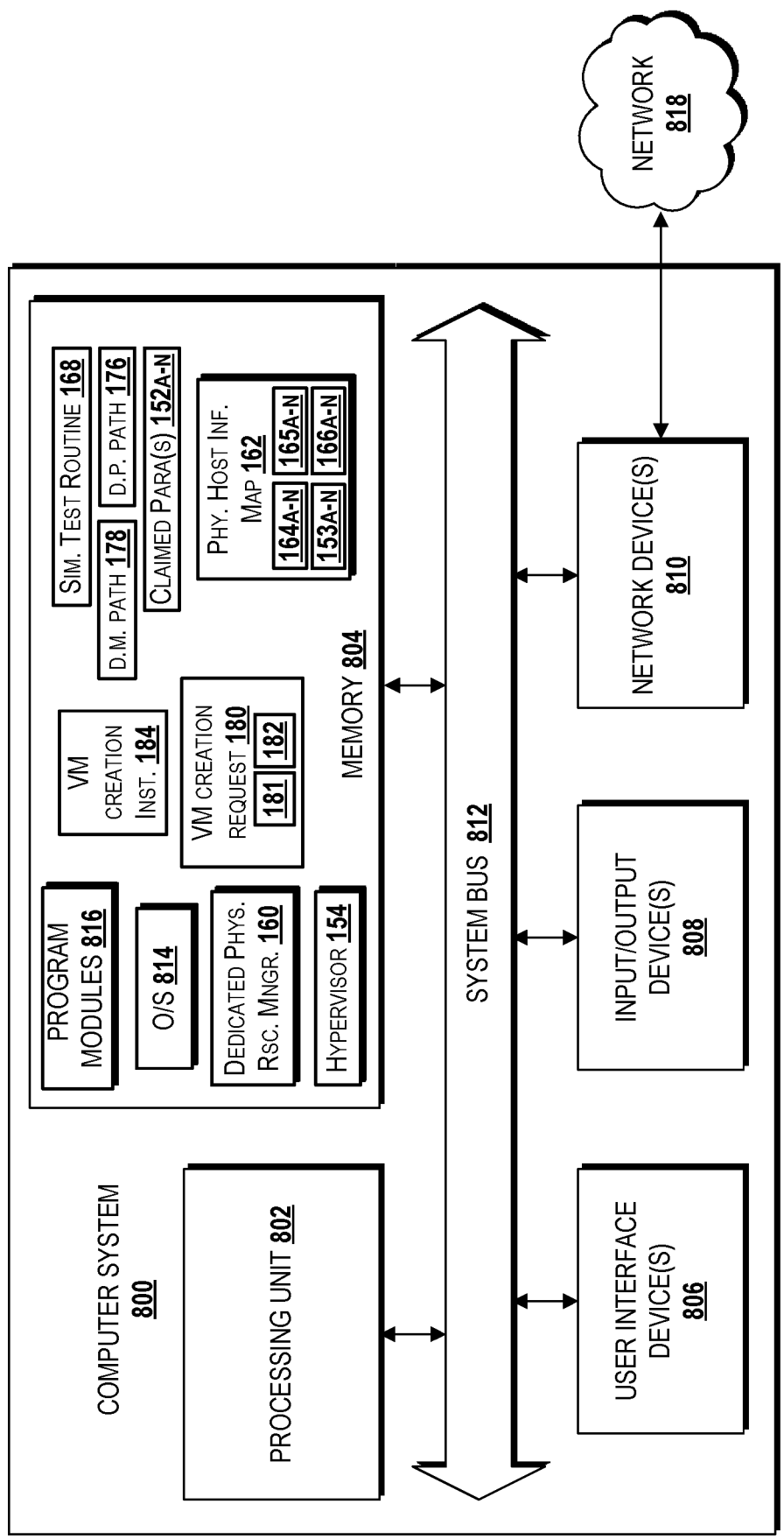
FIG. 8 is a block diagram illustrating an example computer system capable of implementing aspects of the embodiments presented and described herein.

Turning now to FIG. 8, a block diagram is provided illustrating a computer system 800 configured to provide the functionality in accordance with various embodiments of the concepts and technologies disclosed herein. The systems, devices, and other components disclosed herein can utilize, at least in part, an architecture that is the same as or at least similar to the architecture of the computer system 800. In some embodiments, one or more instances of the client device 106, the network access point 104, the physical host servers 116A-N, and/or other devices of the datacenter 110 can be configured the same as, like, or at least similar to the computer system 800. It should be understood, however, that modification to the architecture may be made to facilitate certain interactions among elements described herein.

The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 802 can include one or more central processing units ("CPUs") configured with one or more processing cores, and/or one or more graphics processing unit ("GPU") configured to accelerate operations performed by one or more CPUs. The processing unit 802 can include one or more system-on-chip ("SoC") components along with one or more other components, including, for example, one or more of the memory resources, and/or one or more of the other resources. Processing units are understood by one of ordinary skill in the technology, and therefore are not described in further detail herein. In some embodiments, one or more of the processing units 118A-N, 124A-N and the unassigned processing units 120A-N, 126A-N, can be provided by a processor, such as the processing unit 802. As such, one or more instances of the processing unit 802 can provide the physical host infrastructure 114. It is understood that the processing units 118A-N, 124A-N of the datacenter 110 can be implemented as one or more instances of processing unit 802.

The memory 804 communicates with the processing unit 802 via the system bus 812. In some embodiments, the memory devices 122A-N, 128A-N (and thus also the unassigned memory devices 123A-N, 130A-N) within the datacenter 110 can be implemented as the memory 804. In some embodiments, the memory 804 is operatively connected to a memory controller (not shown) that enables communication with the processing unit 802 via the system bus 812. The illustrated memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein. In some embodiments, for example, the program modules 816 can include the dedicated physical resource manager 160, network administration controller 158, the SDN gateway 112, the hypervisor 154, and/or other program modules. These and/or other programs can be embodied in a computer storage medium including or otherwise storing instructions that, when executed by the processing unit 802, in some embodiments, may perform and/or facilitate performance of one or more of the operations discussed with respect to FIGS. 1, 2, 3, and 4 described in detail above. According to some embodiments, the program modules 816 may be embodied in hardware, software, firmware, or any combination thereof. In some embodiments, the memory 804 also can be configured to store data including, but not limited to, the claimed parameters 152A-N, the actual parameters 153A-N, the physical host infrastructure map 162, the processing unit identifiers 164A-N, the communication path identifiers 165A-N, the memory device identifiers 166A-N, the simulation test routine 168, the candidate resource set 170, dedicated processing path 176, the dedicated memory path 178, the virtual machine creation request 180, the virtual processing requirement 181, the virtual memory requirement 182, the virtual machine creation instruction 184, any other information or data discussed with respect to FIGS. 1, 2, 3, 4, and/or other data, if desired.

By way of example, and not limitation, computer-readable media may store any available communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrases "memory", "memory device", "computer storage medium", and variations thereof, does not include waves or signals per se and/or communication media.

The user interface devices 806 may include one or more devices with which a user accesses the computer system 800. The user interface devices 806 may include, but are not limited to, computers, servers, PDAs, cellular phones, or any suitable computing devices. The I/O devices 808 enable a user to interface with the program modules 816. In one embodiment, the/O devices 808 are operatively connected to an I/O controller (not shown) that enables communication with the processing unit 802 via the system bus 812. The/O devices 808 may include one or more input devices, such as, but not limited to, a keyboard, a mouse, or an electronic stylus. Further, the I/O devices 808 may include one or more output devices, such as, but not limited to, a display screen or a printer. In some embodiments, the I/O devices 808 can be used for manual controls for operations to exercise under certain emergency situations.

The network devices 810 enable the computer system 800 to communicate with other networks or remote systems via a network 818, such as the network 102 and/or the network 600. Examples of the network devices 810 include, but are not limited to, a modem, a radio frequency ("RF") or infrared ("IR") transceiver, a telephonic interface, a bridge, a router, or a network card. The network devices 810 may support communication and functionality with the network 818, such as via physical network functions, virtual network functions, virtual and/or physical edge devices, or the like. The network devices 810 can, in some embodiments, be included in the datacenter 110, such as via the SDN gateway 112. The network 818 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 818 may be or may include a wired network such as, but not limited to, a Wide Area Network ("WAN"), a wired Personal Area Network ("PAN"), a wired Metropolitan Area Network ("MAN"), an optical network, a VoIP network, an IP/MPLS network, a PSTN network, an IMS network, an EPC network, or any other mobile network and/or wireline network.

Based on the foregoing, it should be appreciated that concepts and technologies directed to dedicated optical distribution of computing resources in virtualized environments have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, operations, or mediums described herein. Rather, the specific features, operations, and mediums are disclosed as example forms of implementing the concepts and technologies disclosed herein. The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising: a processor; and a memory storing computer-executable instructions that, in response to execution by the processor, cause the processor to perform operations comprising:
   receiving a virtual machine creation request that includes a virtual processing requirement and a virtual memory requirement for a virtual machine;
   accessing a physical host infrastructure map that identifies remainder resources from physical host servers within a datacenter;
   determining whether each of the remainder resources can be accessed via a dedicated communication path;
   designating at least a portion of the remainder resources determined to be accessible via dedicated communication paths to a candidate resource set;
   creating a simulation test routine based on the virtual processing requirement and the virtual memory requirement;
   establishing a dedicated processing path and a dedicated memory path for the candidate resource set; and
   initiating the simulation test routine on the candidate resource set via the dedicated processing path and the dedicated memory path.

2. The system of claim 1, wherein the remainder resources comprise a plurality of unassigned processing units and a plurality of unassigned memory devices, and where the candidate resource set comprises at least one unassigned processing unit from the plurality of unassigned processing units and at least one unassigned memory device from the plurality of unassigned memory devices.

3. The system of claim 2, wherein the operations further comprise removing an unassigned processing unit from the remainder resources in response to determining that the unassigned processing unit cannot be accessed via a dedicated communication path.

4. The system of claim 1, wherein the operations further comprise determining whether the candidate resource set satisfies the virtual processing requirement and the virtual memory requirement for the virtual machine.

5. The system of claim 4, wherein the operations further comprise:
   in response to determining that the candidate resource set does not satisfy at least one of the virtual processing requirement or the virtual memory requirement for the virtual machine, reconfiguring at least one of the dedicated processing path or the dedicated memory path;
   reinitiating the simulation test routine; and
   determining that reconfiguring at least one of the dedicated processing path or the dedicated memory path enables the candidate resource set to satisfy the virtual processing requirement and the virtual memory requirement for the virtual machine.

6. The system of claim 4, wherein the operations further comprise:
   in response to determining that the candidate resource set does not satisfy at least one of the virtual processing requirement or the virtual memory requirement for the virtual machine, reconfiguring the candidate resource set to include another remainder resource;
   reinitiating the simulation test routine; and
   determining that reconfiguring the candidate resource set to include another remainder resource enables the candidate resource set to satisfy the virtual processing requirement and the virtual memory requirement for the virtual machine.

7. The system of claim 4, wherein the operations further comprise in response to determining that candidate resource set satisfies the virtual processing requirement and the virtual memory requirement for the virtual machine, instructing a hypervisor to create the virtual machine using the candidate resource set.

8. A method comprising:
   receiving, by a system of a datacenter, a virtual machine creation request that includes a virtual processing requirement and a virtual memory requirement for a virtual machine;
   accessing, by the system, a physical host infrastructure map that identifies remainder resources from physical host servers within the datacenter;

determining, by the system, whether each of the remainder resources can be accessed via a dedicated communication path;

designating, by the system, at least a portion of the remainder resources determined to be accessible via dedicated communication paths to a candidate resource set;

creating, by the system, a simulation test routine based on the virtual processing requirement and the virtual memory requirement;

establishing, by the system, a dedicated processing path and a dedicated memory path for the candidate resource set; and initiating, by the system, the simulation test routine on the candidate resource set via the dedicated processing path and the dedicated memory path.

9. The method of claim 8, wherein the remainder resources comprise a plurality of unassigned processing units and a plurality of unassigned memory devices, and wherein the candidate resource set comprises at least one unassigned processing unit from the plurality of unassigned processing units and at least one unassigned memory device from the plurality of unassigned memory devices.

10. The method of claim 9, further comprising removing an unassigned processing unit from the remainder resources in response to determining that the unassigned processing unit cannot be accessed via a dedicated communication path.

11. The method of claim 8, further comprising determining, by the system, whether the candidate resource set satisfies the virtual processing requirement and the virtual memory requirement for the virtual machine.

12. The method of claim 11, further comprising:

in response to determining that the candidate resource set does not satisfy at least one of the virtual processing requirement or the virtual memory requirement for the virtual machine, reconfiguring, by the system, at least one of the dedicated processing path or the dedicated memory path;

reinitiating, by the system, the simulation test routine; and determining, by the system, that reconfiguring at least one of the dedicated processing path or the dedicated memory path enables the candidate resource set to satisfy the virtual processing requirement and the virtual memory requirement for the virtual machine.

13. The method of claim 11, further comprising:

in response to determining that the candidate resource set does not satisfy at least one of the virtual processing requirement or the virtual memory requirement for the virtual machine, reconfiguring, by the system, the candidate resource set to include another remainder resource;

reinitiating, by the system, the simulation test routine; and determining, by the system, that reconfiguring the candidate resource set to include another remainder resource enables the candidate resource set to satisfy the virtual processing requirement and the virtual memory requirement for the virtual machine.

14. The method of claim 11, further comprising in response to determining that candidate resource set satisfies the virtual processing requirement and the virtual memory requirement for the virtual machine, instructing, by the system, a hypervisor to create the virtual machine using the candidate resource set.

15. A computer storage medium having computer-executable instructions stored thereon that, in response to execution by a processor, cause the processor to perform operations comprising:

receiving a virtual machine creation request that includes a virtual processing requirement and a virtual memory requirement for a virtual machine;

accessing a physical host infrastructure map that identifies remainder resources from physical host servers within a datacenter;

determining whether each of the remainder resources can be accessed via a dedicated communication path;

designating at least a portion of the remainder resources determined to be accessible via dedicated communication paths to a candidate resource set;

creating a simulation test routine based on the virtual processing requirement and the virtual memory requirement;

establishing a dedicated processing path and a dedicated memory path for the candidate resource set; and initiating the simulation test routine on the candidate resource set via the dedicated processing path and the dedicated memory path.

16. The computer storage medium of claim 15, wherein the remainder resources comprise a plurality of unassigned processing units and a plurality of unassigned memory devices, and wherein the candidate resource set comprises at least one unassigned processing unit from the plurality of unassigned processing units and at least one unassigned memory device from the plurality of unassigned memory devices.

17. The computer storage medium of claim 16, wherein the operations further comprise removing an unassigned processing unit from the remainder resources in response to determining that the unassigned processing unit cannot be accessed via a dedicated communication path.

18. The computer storage medium of claim 15, wherein the operations further comprise:

determining whether the candidate resource set satisfies the virtual processing requirement and the virtual memory requirement for the virtual machine;

in response to determining that the candidate resource set does not satisfy at least one of the virtual processing requirement or the virtual memory requirement for the virtual machine, reconfiguring at least one of the dedicated processing path or the dedicated memory path;

reinitiating the simulation test routine; and determining that reconfiguring at least one of the dedicated processing path or the dedicated memory path enables the candidate resource set to satisfy the virtual processing requirement and the virtual memory requirement for the virtual machine.

19. The computer storage medium of claim 15, wherein the operations further comprise:

determining whether the candidate resource set satisfies the virtual processing requirement and the virtual memory requirement for the virtual machine;

in response to determining that the candidate resource set does not satisfy at least one of the virtual processing requirement or the virtual memory requirement for the virtual machine, reconfiguring the candidate resource set to include another remainder resource;

reinitiating the simulation test routine; and determining that reconfiguring the candidate resource set to include another remainder resource enables the candidate resource set to satisfy the virtual processing requirement and the virtual memory requirement for the virtual machine.

20. The computer storage medium of claim 15, wherein the operations further comprise:

determining whether the candidate resource set satisfies the virtual processing requirement and the virtual memory requirement for the virtual machine; and in response to determining that candidate resource set satisfies the virtual processing requirement and the virtual memory requirement for the virtual machine, instructing a hypervisor to create the virtual machine using the candidate resource set.

* * * * *